US012794962B2

(12) United States Patent
Sebastian

(10) Patent No.: US 12,794,962 B2
(45) **Date of Patent: *Nov. 10, 2026**

(54) INTERNET PROTOCOL BROADCASTING

(71) Applicant: VIASAT, INC., Carlsbad, CA (US)

(72) Inventor: William B. Sebastian, Falmouth, MA (US)

(73) Assignee: VIASAT, INC., Carlsbad, CA (US)

( * ) Notice: Subject to any disclaimer, the term of this patent is extended or adjusted under 35 U.S.C. 154(b) by 132 days.

This patent is subject to a terminal disclaimer.

(21) Appl. No.: 18/765,136

(22) Filed: Jul. 5, 2024

(65) Prior Publication Data

US 2024/0364766 A1 Oct. 31, 2024

Related U.S. Application Data

(60) Continuation of application No. 17/542,056, filed on Dec. 3, 2021, now Pat. No. 12,218,995, which is a (Continued)

(51) Int. Cl.

*H04L 65/00* (2022.01)
*H04L 12/18* (2006.01)

(Continued)

(52) U.S. Cl.

CPC ............ *H04L 65/611* (2022.05); *H04L 12/18* (2013.01); *H04L 45/16* (2013.01); *H04L 49/201* (2013.01);

(Continued)

(58) Field of Classification Search

None

See application file for complete search history.

(56) References Cited

U.S. PATENT DOCUMENTS

| | | | |
|---|---|---|---|
| 5,408,470 A | 4/1995 | Rothrock et al. | |
| 5,740,367 A | 4/1998 | Spilo | |

(Continued)

FOREIGN PATENT DOCUMENTS

| | | | |
|---|---|---|---|
| EP | 1670164 A2 * | 6/2006 | ............. H04H 40/18 |
| WO | 2006116368 A2 | 11/2006 | |
| WO | 2008070614 A2 | 6/2008 | |

OTHER PUBLICATIONS

International Search Report completed by Korean Intellectual Property Office on Oct. 12, 2010 for International Patent Application PCT/US2010/026788.

(Continued)

*Primary Examiner* — Gerald A Smarth
(74) *Attorney, Agent, or Firm* — HOLZER PATEL DRENNAN

(57) ABSTRACT

Methods, apparatuses, and systems are provided for improving utilization of a communications system through various atom-based techniques for enhancing the viewing experience for Internet protocol content. Some embodiments exploit atom-based processing to determine which content atoms to broadcast (e.g., multicast) over which channels to which subscribers. Other embodiments make atom-based filtering, caching, and/or other determinations at the user terminal. For example, low-level (e.g., physical layer) filtering may be used to limit the amount of user-layer processing needed, and to facilitate delivery of content to those users most likely to desire that content. Still other embodiments allow users to create customized channels of cached content for viewing as a shared channel. Embodiments include techniques for addressing synchronization of channel content and viewing, and social networking, for subscribers to the shared channel. The shared channels may be further used to facilitate social networking among subscribers.

53 Claims, 11 Drawing Sheets

Related U.S. Application Data continuation of application No. 16/839,965, filed on Apr. 3, 2020, now Pat. No. 11,212,328, which is a continuation of application No. 15/221,133, filed on Jul. 27, 2016, now Pat. No. 10,637,901, which is a continuation of application No. 14/800,434, filed on Jul. 15, 2015, now Pat. No. 9,432,307, which is a division of application No. 13/919,938, filed on Jun. 17, 2013, now Pat. No. 9,094,220, which is a division of application No. 12/720,986, filed on Mar. 10, 2010, now Pat. No. 8,483,217.

(60) Provisional application No. 61/158,997, filed on Mar. 10, 2009.

(51) Int. Cl.

| | |
|---|---|
| ***H04L 45/16*** | (2022.01) |
| ***H04L 49/201*** | (2022.01) |
| ***H04L 65/611*** | (2022.01) |
| ***H04L 67/561*** | (2022.01) |
| ***H04N 7/173*** | (2011.01) |
| ***H04N 21/24*** | (2011.01) |
| ***H04N 21/25*** | (2011.01) |
| ***H04N 21/45*** | (2011.01) |
| ***H04N 21/61*** | (2011.01) |
| ***H04N 21/6405*** | (2011.01) |
| ***H04N 21/8405*** | (2011.01) |

(52) U.S. Cl.

CPC ....... *H04L 67/561* (2022.05); *H04N 7/17318* (2013.01); *H04N 21/2402* (2013.01); *H04N 21/252* (2013.01); *H04N 21/4532* (2013.01); *H04N 21/6125* (2013.01); *H04N 21/6405* (2013.01); *H04N 21/8405* (2013.01)

(56) References Cited

U.S. PATENT DOCUMENTS

| | | | |
|---|---|---|---|
| 5,870,754 | A | 2/1999 | Dimitrova et al. |
| 5,905,981 | A | 5/1999 | Lawler |
| 6,182,133 | B1 | 1/2001 | Horvitz |
| 6,298,482 | B1 | 10/2001 | Seidman et al. |
| 6,339,787 | B1 | 1/2002 | Yohe et al. |
| 6,701,316 | B1 | 3/2004 | Li et al. |
| 6,879,808 | B1 | 4/2005 | Nations et al. |
| 7,124,305 | B2 | 10/2006 | Margolus et al. |
| 7,130,890 | B1 | 10/2006 | Kumar et al. |
| 7,359,956 | B2 | 4/2008 | Kanai et al. |
| 7,430,331 | B2 | 9/2008 | Singh |
| 7,509,667 | B1 | 3/2009 | Cook |
| 7,636,767 | B2 | 12/2009 | Lev-Ran et al. |
| 7,639,636 | B2 | 12/2009 | Lee et al. |
| 7,680,897 | B1 | 3/2010 | Carter et al. |
| 7,681,032 | B2 | 3/2010 | Peled et al. |
| 7,716,367 | B1 | 5/2010 | Leighton et al. |
| 7,778,438 | B2 | 8/2010 | Malone |
| 7,814,149 | B1 | 10/2010 | Stringham |
| 7,840,220 | B1 | 11/2010 | Mitchell |
| 7,917,531 | B2 | 3/2011 | Sakurai et al. |
| 7,941,409 | B2 | 5/2011 | Mimatsu |
| 7,953,881 | B1 | 5/2011 | Vadlakonda et al. |
| 8,041,677 | B2 | 10/2011 | Sumner et al. |
| 8,055,616 | B2 | 11/2011 | Johnston et al. |
| 8,082,228 | B2 | 12/2011 | Mu |
| 8,284,773 | B1 | 10/2012 | Woleben et al. |
| 8,483,217 | B2 | 7/2013 | Sebastian |
| 2001/0016836 | A1 | 8/2001 | Boccon-Gibod et al. |
| 2001/0037212 | A1 | 11/2001 | Motosuna et al. |
| 2001/0043600 | A1 | 11/2001 | Chatterjee et al. |
| 2002/0001310 | A1* | 1/2002 | Mai ......................... H04L 45/00 370/432 |
| 2002/0010757 | A1 | 1/2002 | Granik et al. |
| 2002/0026478 | A1 | 2/2002 | Rodgers et al. |
| 2002/0073167 | A1 | 6/2002 | Merkley et al. |
| 2002/0154887 | A1 | 10/2002 | Lu |
| 2002/0157095 | A1 | 10/2002 | Masumitsu et al. |
| 2002/0188735 | A1 | 12/2002 | Needham et al. |
| 2002/0194473 | A1 | 12/2002 | Pope et al. |
| 2003/0018581 | A1 | 1/2003 | Bratton et al. |
| 2004/0098748 | A1 | 5/2004 | Bo et al. |
| 2004/0156333 | A1 | 8/2004 | Bush |
| 2004/0266336 | A1 | 12/2004 | Patsiokas et al. |
| 2005/0033747 | A1 | 2/2005 | Wittkotter |
| 2005/0053023 | A1 | 3/2005 | Rajkotia et al. |
| 2005/0131903 | A1 | 6/2005 | Margolus et al. |
| 2005/0193015 | A1 | 9/2005 | Logston et al. |
| 2006/0031203 | A1 | 2/2006 | Rosenbaum et al. |
| 2006/0036520 | A1* | 2/2006 | O'Neill .................. G06Q 30/04 705/34 |
| 2006/0095333 | A1 | 5/2006 | Gambhir |
| 2006/0133429 | A1 | 6/2006 | Seo et al. |
| 2006/0184960 | A1 | 8/2006 | Horton et al. |
| 2006/0217111 | A1 | 9/2006 | Marolia et al. |
| 2006/0277257 | A1 | 12/2006 | Kromann et al. |
| 2006/0288072 | A1 | 12/2006 | Knapp et al. |
| 2007/0033408 | A1 | 2/2007 | Morten |
| 2007/0101074 | A1 | 5/2007 | Patterson |
| 2007/0111713 | A1 | 5/2007 | Silverbrook et al. |
| 2007/0116151 | A1 | 5/2007 | Thesling |
| 2007/0121612 | A1 | 5/2007 | Nadeau et al. |
| 2007/0133554 | A1 | 6/2007 | Ederer et al. |
| 2007/0143484 | A1 | 6/2007 | Drouet et al. |
| 2007/0174246 | A1 | 7/2007 | Sigurdsson et al. |
| 2007/0174476 | A1 | 7/2007 | Mcenroe et al. |
| 2007/0256021 | A1 | 11/2007 | Prager et al. |
| 2007/0288518 | A1 | 12/2007 | Crigler et al. |
| 2008/0005086 | A1 | 1/2008 | Moore |
| 2008/0040354 | A1 | 2/2008 | Ray et al. |
| 2008/0066182 | A1 | 3/2008 | Hickmott et al. |
| 2008/0144713 | A1 | 6/2008 | Kimmich et al. |
| 2008/0155614 | A1 | 6/2008 | Cooper et al. |
| 2008/0159278 | A1 | 7/2008 | Balraj et al. |
| 2008/0175239 | A1 | 7/2008 | Sistanizadeh et al. |
| 2008/0195664 | A1 | 8/2008 | Maharajh et al. |
| 2008/0235090 | A1 | 9/2008 | Lundstrom et al. |
| 2008/0235739 | A1 | 9/2008 | Coebergh |
| 2008/0256138 | A1 | 10/2008 | Sim-Tang |
| 2008/0263130 | A1 | 10/2008 | Michalowitz et al. |
| 2008/0263581 | A1 | 10/2008 | Turner |
| 2008/0275772 | A1* | 11/2008 | Suryanarayana .. G06Q 30/0277 705/14.66 |
| 2008/0320151 | A1 | 12/2008 | Mccanne et al. |
| 2009/0005547 | A1 | 1/2009 | Khvorova et al. |
| 2009/0006368 | A1 | 1/2009 | Mei et al. |
| 2009/0037393 | A1 | 2/2009 | Fredricksen et al. |
| 2009/0049469 | A1 | 2/2009 | Small et al. |
| 2009/0055862 | A1 | 2/2009 | Knoller et al. |
| 2009/0060086 | A1 | 3/2009 | Kimmich et al. |
| 2009/0158318 | A1 | 6/2009 | Levy |
| 2009/0168752 | A1 | 7/2009 | Segel |
| 2009/0168795 | A1 | 7/2009 | Segel |
| 2009/0172745 | A1 | 7/2009 | Horozov et al. |
| 2009/0234809 | A1 | 9/2009 | Bluger et al. |
| 2009/0288116 | A1 | 11/2009 | Zalewski |
| 2009/0313329 | A1 | 12/2009 | Agrawal et al. |
| 2010/0005488 | A1 | 1/2010 | Rakib et al. |
| 2010/0058430 | A1 | 3/2010 | Jones et al. |
| 2010/0077056 | A1* | 3/2010 | Kokal .............. H04N 21/47202 709/217 |
| 2010/0083322 | A1 | 4/2010 | Rouse |
| 2010/0177642 | A1 | 7/2010 | Sebastian et al. |
| 2010/0180029 | A1 | 7/2010 | Fourman |
| 2012/0060121 | A1 | 3/2012 | Goldberg et al. |
| 2013/0074003 | A1 | 3/2013 | Dolenc |

OTHER PUBLICATIONS

International Search Report completed Oct. 13, 2009 by the Japanese Patent Office for International Patent Application PCT/JP2009/062127.

(56) References Cited

OTHER PUBLICATIONS

U.S. Appl. No. 12/477,814, filed Jun. 3, 2010.
U.S. Appl. No. 12/64,726, filed Jan. 8, 2010.
U.S. Appl. No. 12/651,909, filed Jan. 4, 2010.
U.S. Appl. No. 12/684,648, filed Jan. 8, 2010.
U.S. Appl. No. 12/685,729, filed Jan. 12, 2010.
U.S. Appl. No. 12/685,920, filed Jan. 12, 2010.
U.S. Appl. No. 12/686,744, filed Jan. 13, 2010.
U.S. Appl. No. 61/231,265, filed Aug. 4, 2009.
Paula, S. , "Distributed caching with centralized control", Computer Communications 24, 2001, 256-268.
Selvakumara, S. , et al., "Implementation and comparison of distributed caching schemes", Computer Communications 24, 2001, 677-684.

* cited by examiner

INTERNET PROTOCOL BROADCASTING

RELATED APPLICATIONS

This application is a continuation application U.S. application Ser. No. 17/542,056, filed on Dec. 3, 2021, which is a continuation application U.S. application Ser. No. 16/839,965, filed on Apr. 3, 2020, which is a continuation of U.S. application Ser. No. 15/221,133, filed on Jul. 27, 2016, now U.S. Pat. No. 10,637,901, which is a continuation of U.S. Application No. 114/800,434, filed on Jul. 15, 2015, now U.S. Pat. No. 9,432,207, which is a division of U.S. application Ser. No. 13/919,938, filed on Jun. 17, 2013, now U.S. Pat. No. 9,094,220, which is a division of U.S. application Ser. No. 12/720,986, filed on Mar. 10, 2010, now U.S. Pat. No. 8,483,217, which claims the benefit of U.S. provisional application No. 61/158,997, filed on Mar. 10, 2009, the entirety of which is incorporated herein by reference.

BACKGROUND

This disclosure relates in general to communications and, but not by way of limitation, to providing enhanced communications services to users of a communications system.

In some topologies of communications systems, groups of users share some or all of the forward link. For example, in some satellite communications systems, users share spot beams for communicating with a service provider (e.g., via a base station and/or gateway). Communications services provided to the users over the shared forward link may be affected by a number of factors, including bandwidth and other link conditions, limitations on the numbers of concurrent session streams that can be supported, etc. For example, because all users sharing the forward link also share the link's bandwidth, any unnecessary redundancies in communications may cause sub-optimal utilization of the forward link.

While some techniques may be available for addressing these issues, including using multicast channels to exploit shared forward links and pre-pushing content to user caches, these techniques may have certain limitations. For example, because a communications system may only be able to support a limited number of concurrent session streams, it may be difficult for users to determine to which session streams it may be worth subscribing (e.g., particularly where the user may only be interested in a portion of the content being communicated over that stream), subscribing or unsubscribing to session streams may involve time, bandwidth costs, management overhead, processor (e.g., central processing unit (CPU)) overhead, etc.

SUMMARY

Among other things, methods, systems, devices, and software are provided for improving utilization of a communications system through various atom-based techniques for enhancing viewing experience for Internet protocol (IP) content.

According to some embodiments, IP channels (e.g., multicast session streams, etc.) are configured as streams of atoms. Atoms may be prioritized according to one or more criteria, and used to make various multicast determinations. For example, in a communications system having shared forward links and limited private IP capacity (e.g., a limited number of sessions), it may be desirable to categorize and/or prioritize streams of atoms for determining which content to multicast.

According to other embodiments, a user modem is described for making filtering, caching, and/or other determinations for received streams at lower layers (e.g., the physical layer), according to the content atoms in the stream. For example, in a typical modem, higher bandwidth processing may be performed at lower layers than at higher levels (e.g., in software at the user layer). As such, it may be impractical for user modems to subscribe to all session streams that could potentially have an item of interest to the user and to quickly make filtering decisions within and/or among the multicast session streams at the user layer. In some embodiments, a metadata stream is sent to inform user terminals about what content atoms will be arriving on one or more channels. Each atom may be associated with a substantially unique identifier. If the user terminal is interested in the atom, it may direct the user terminal to listen for that unique identifier. When the atom is received, the atom payload may be consumed (e.g., stored in a user dictionary, sent to a content viewer, etc.).

According to still other embodiments, users can create customized channels of cached content for viewing as an IP channel. Subscribers to the channel may substantially concurrently watch the IP channel content (e.g., like a broadcast channel) from their respective local caches. Embodiments address synchronization of channel content and viewing for subscribers to the shared channel. In certain embodiments, social networking is facilitated between the subscribers in association with synchronized viewing of the customized channel.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
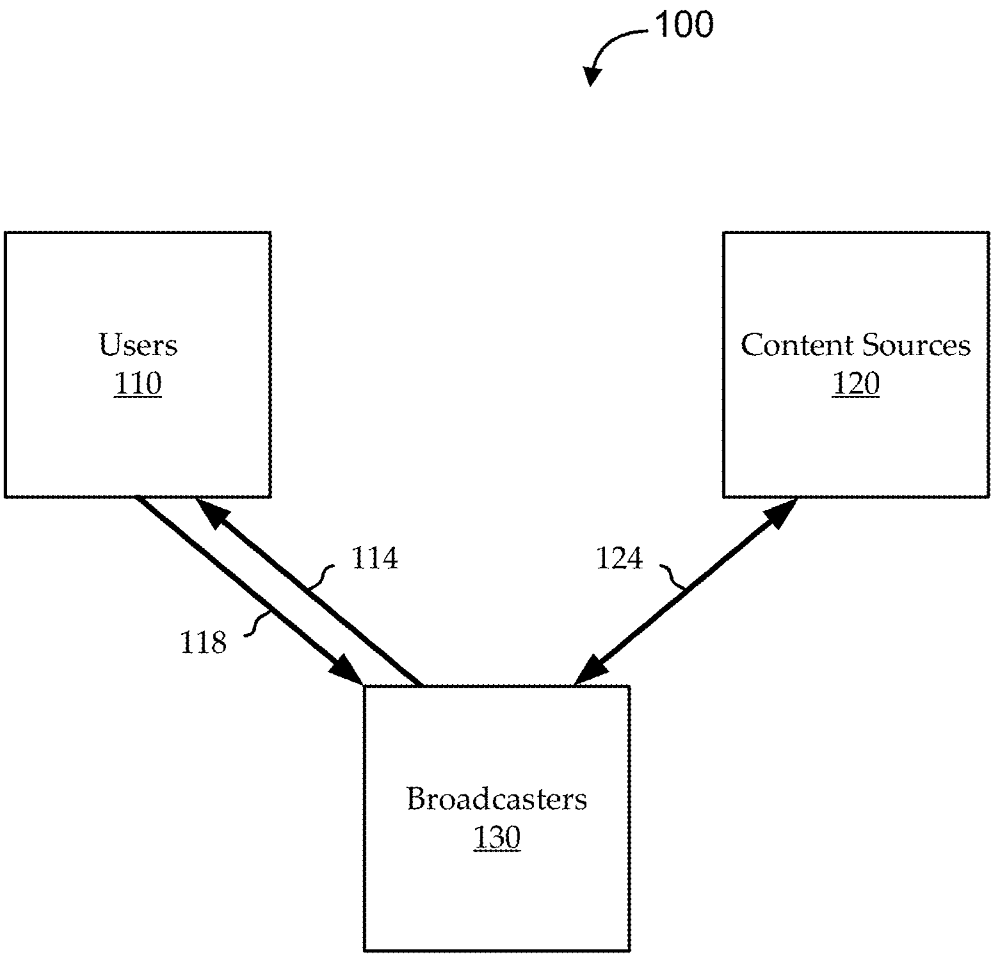
FIG. 1 shows a simplified block diagram of a communications system having users, content sources, and broadcasters.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

In a typical IP communications system, a user may request content over the Internet. For example, one or more private IP connections may be established between the user and one or more locations over the Internet. In one embodiment, the user sends a search query to search for the content or to determine what content is available. A search engine or other indexing module (e.g., device, application, etc.) responds with results to the query, where available. For example, an indexing module responds with a list of content atoms available for download according to the query. The user may then send a request to download the atom (e.g., an HTTP GET request), and may receive a response containing the atom from an appropriate content source.

In certain types of communications networks, at least a portion of the forward link for communicating content is shared among multiple users. For example, in a satellite link, any content communicated over a channel may be seen by all users tuned to receive that channel without any additional bandwidth costs to the system. Similarly, in a cable communications link, a cable company may run a cable line to a neighborhood aggregator, from which individual coaxial lines communicate last mile traffic to individual households. Each individual coaxial cable may carry all the traffic for the entire neighborhood, even where some of that traffic is destined only for particular households. As with the satellite link, all the cable subscriber households in the same neighborhood can effectively receive all the traffic without additional bandwidth costs to the system.

Even where there is a shared forward link, there may still be costs and/or limitations to content sharing. For example, subscribing or unsubscribing to session streams may involve time, management overhead, processor (e.g., CPU) overhead, etc. Further, typical communications systems may only be able to support a limited number of concurrent session streams. Each new session stream that is created may take capacity away from creating alternate session streams. Still, particularly where the communications system cannot support individual (e.g., private IP session) streams to handle each request from every user, content sharing (e.g., through multicasting) may help address certain capacity limitations.

In some embodiments, this content sharing function is implemented by broadcasters. For example, a broadcaster may identify content on the Internet that will be enjoyed by groups of subscribers and may send the content across a shared link. FIG. 1 shows a simplified block diagram of a communications system 100 having users 110, content sources 120, and broadcasters 130.

Users 110 notify the broadcasters 130 of their interests, preferences, and priorities, as illustrated by arrow 114. The broadcasters 130 then search content sources 120 (e.g., over the Internet), via arrow 124, to identify content that would appeal to enough users 110 to make broadcasting that content worthwhile. The broadcasters 130 may then download the content from the content sources 120 and then broadcast the content to the users 110 via the shared link, as illustrated by arrow 118.

Figure 2A:
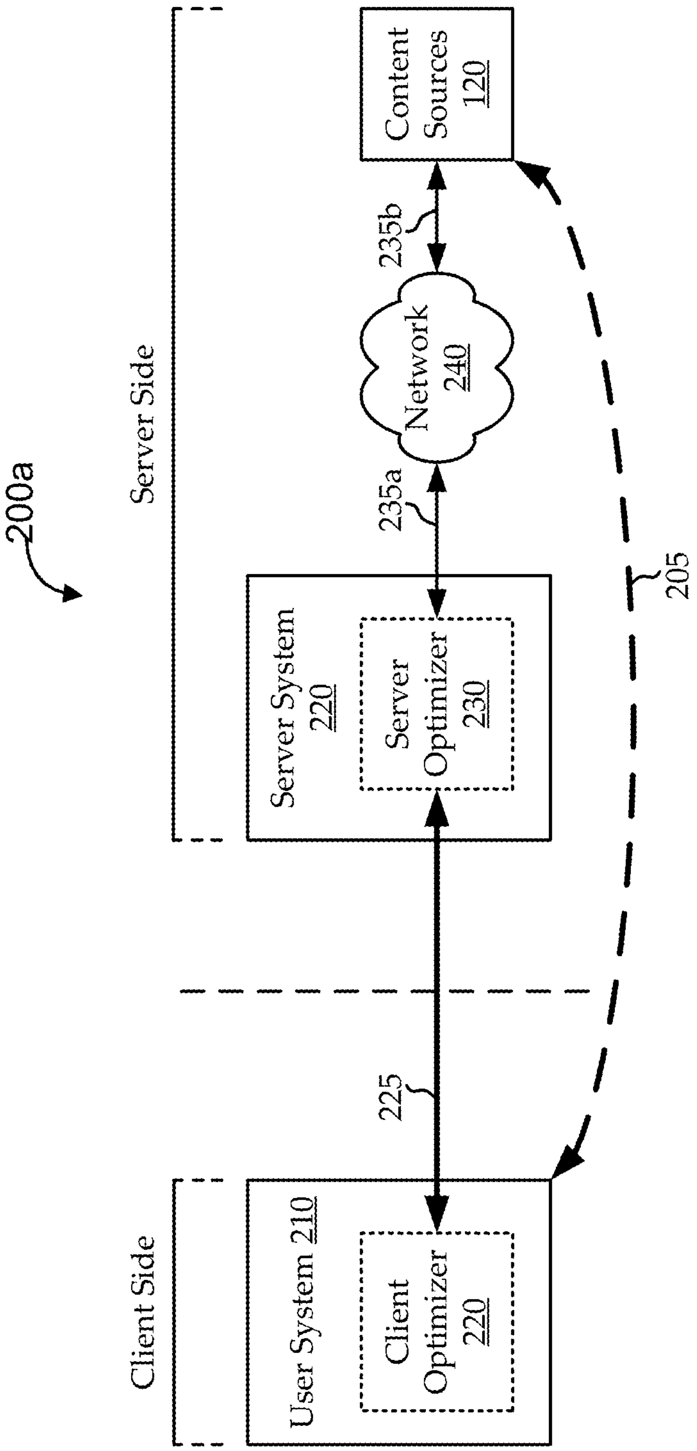
FIG. 2A shows a simplified block diagram of one embodiment of a communications system for use with various embodiments.

Notably, many topologies of communications systems are possible for implementing IP broadcasting functionality, according to various embodiments. Some embodiments implement some or all of the functionality using one or more optimization components. For example, FIG. 2A shows a simplified block diagram of one embodiment of a communications system 200*a* for use with various embodiments.

The communications system 200*a* facilitates communications between users 110 (illustrated as a user system 210) and content sources 120 via a client optimizer 220, a server optimizer 230, and a network 240. The client optimizer 220 may be implemented as part of one of the users 110 of FIG. 1, and the server optimizer 230 may be implemented as part of one of the broadcasters 130 of FIG. 1. The client optimizer 220 and the server optimizer 230 are configured to effectively provide an optimizer tunnel 205 between the user system 210 and the content source 120, including providing certain communications functionality.

Embodiments of the optimizer (e.g., the server optimizer 230, the client optimizer 220, and the resulting optimizer tunnel 205) can be implemented in a number of ways without departing from the scope of the invention. In some embodiments, the optimizer is implemented as a proxy, such that the server optimizer 230 is a proxy server, the client optimizer 220 is a proxy client, and the optimizer tunnel 205 is a proxy tunnel. For example, a transparent intercept proxy can be used to intercept traffic in a way that is substantially transparent to users at the client-side of the proxy tunnel. In other embodiments, the optimizer is implemented as an in-line optimizer. For example, the client optimizer 220 is implemented within a user terminal and the server optimizer 230 is implemented within a provider terminal (e.g., a satellite base station or gateway, a cable head-end, a digital subscriber line access multiplexer (DSLAM), etc.). Other configurations are possible in other embodiments. For example, embodiments of the server optimizer 230 are implemented in the Internet cloud (e.g., on commercial network leased server space). Embodiments of the client optimizer 220 are implemented within a user's personal computer, within a user's modem, in a physically separate component at the customer premises, etc.

It is worth noting that references herein to "intercepting" data should be construed broadly to include any useful slowing, sampling, re-routing, and/or other techniques that allow processing of the data as required according to various embodiments. In some embodiments, traffic passes through the server optimizer 230, where it is "intercepted" by being buffered for analysis and processing. For example, the buffering may be used to slow and accumulate traffic for fingerprint generation and analysis, as described more fully below. Notably, certain embodiments described as using an optimizer component (e.g., the server optimizer 230) to intercept the traffic may actually be implemented by having a different component to intercept the traffic, from which the optimizer component may receive the intercepted traffic for processing.

Embodiments of the user system 210 may include any component or components for providing a user with network interactivity. For example, the user system 210 may include any type of computational device, network interface device, communications device, or other device for communicating data to and from the user. Typically, the communications system 200*a* facilitates communications between multiple user systems 210 and a variety of content sources 120 over one or more networks 240 (only one of each is shown in FIG. 2A for the sake of clarity). The content sources 120 are in communication with the server optimizer 230 via one or more networks 240. The network 240 may be any type of network 240 and can include, for example, the Internet, an Internet protocol ("IP") network, an intranet, a wide-area network ("WAN"), a local-area network ("LAN"), a virtual private network ("VPN"), the Public Switched Telephone Network ("PSTN"), and/or any other type of network 240 supporting data communication between devices described herein, in different embodiments. The network 240 may also include both wired and wireless connections, including optical links.

As used herein, "content source" is intended broadly to include any source of content in which the users may be interested. For example, a content source 120 may provide website content, television content, file sharing, multimedia serving, voice-over-Internet-protocol (VoIP) handling, and/or any other useful content. It is worth noting that, in some embodiments, the content sources 120 are in direct communication with the server optimizer 230 (e.g., not through the network 240). For example, the server optimizer 230 may be located in a gateway that includes a content or application server. As such, discussions of embodiments herein with respect to communications with content sources 120 over the network 240 are intended only to be illustrative, and should not be construed as limiting.

In some embodiments, when the user system 210 communicates with the content source 120, the server optimizer 230 intercepts the communications for one or more purposes. As described below, the server optimizer 230 may be part of a server system 220 that includes components for server-side communications (e.g., base stations, gateways, satellite modem termination systems (SMTSs), digital subscriber line access multiplexers (DSLAMs), etc., as described below with reference to FIG. 2). The server optimizer 230 may act as a transparent and/or intercepting proxy. For example, the client optimizer 220 is in communication with the server optimizer 230 over a client-server communication link 225, and the server optimizer 230 is in communication with the content source 120 over a content network link 235. The server optimizer 230 may act as a transparent man-in-the-middle to intercept the data as it passes between the client-server communication link 225 and the content network link 235. Some purposes of the interception may include filtering, caching, parsing, and/or otherwise processing the requests and responses. For example, when the user system 210 requests a web object from a content source 120, the server optimizer 230 may intercept and parse the request to implement prefetching and/or other types of functionality.

It is worth noting that embodiments of the client-server communication link 225 (e.g., between the client optimizer 220 and the server optimizer 230) and the content network link 235 (e.g., between the server optimizer 230 and the content sources 120 via the networks 240) can be implemented as various types of links have different and/or changing link characteristics, including, for example, differences in bandwidth, latency, cost per bit, etc. For example, while certain embodiments are described in the context of a satellite communications system, where the client-server communication link 225 includes at least one satellite link, other topologies and link types are possible.

Figure 2B:
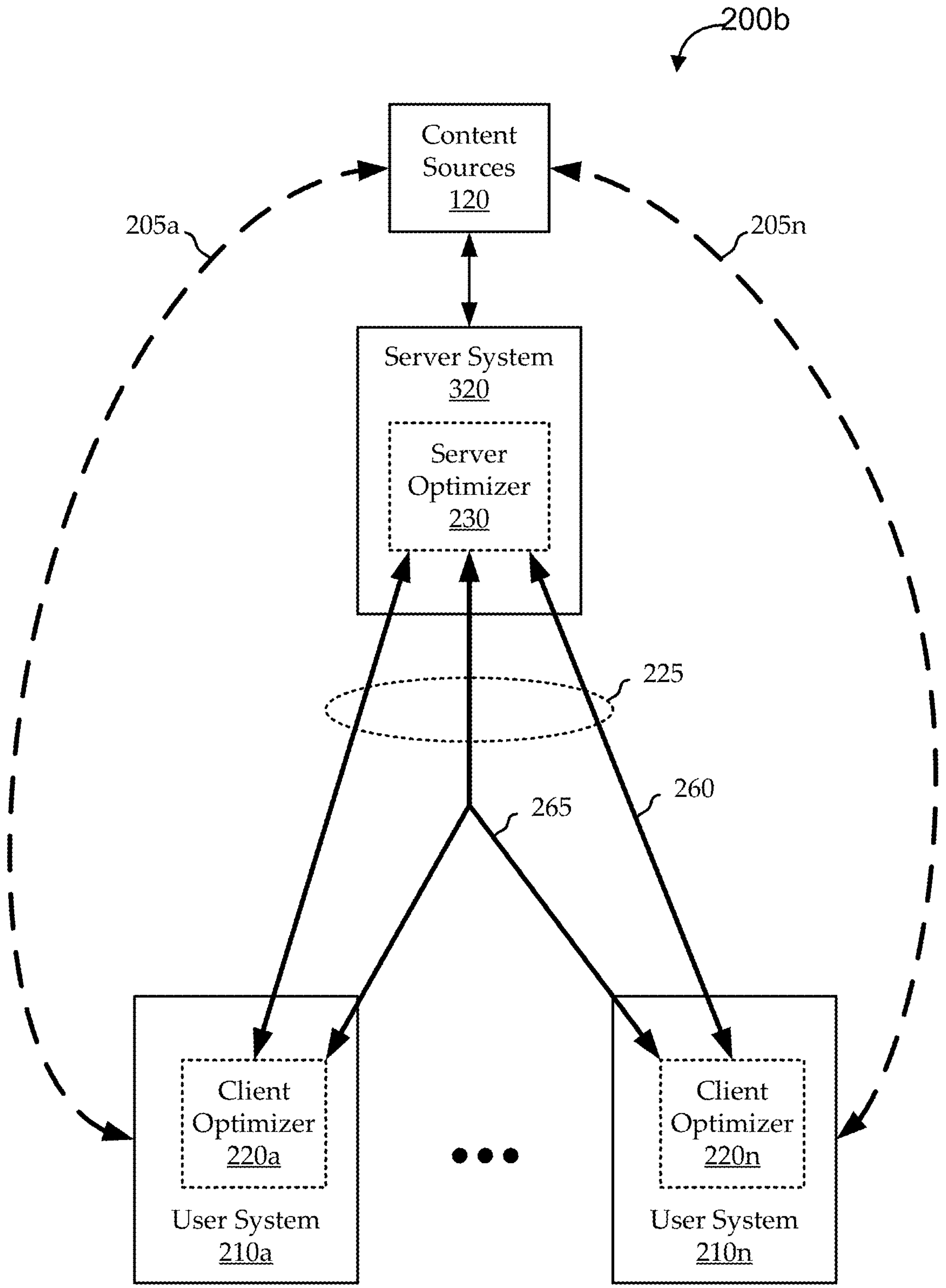
FIG. 2B shows a simplified block diagram of another embodiment of a communications system having multiple optimizer tunnels for use with various embodiments.

While the communications system 200*a* illustrated in FIG. 2A shows only one optimizer tunnel 205 between one server system 220 and one user system 210, embodiments typically operate in the context of, and take advantage of, multiple optimizer tunnels 205. FIG. 2B shows a simplified block diagram of another embodiment of a communications system 200*b* having multiple optimizer tunnels 205 for use with various embodiments. The communications system 200*b* facilitates communications between a server system 320 and multiple user systems 210, via a respective server optimizer 230 and multiple client optimizers 220. The client optimizers 220 and the server optimizer 230 are configured to effectively provide tunnels 205 between the user systems 210 and content sources 120.

A client-server communication link 225 between the server optimizer 230 and the client optimizers 220 supports one or more unicast service flows 260 and one or more multicast service flows 265 for supporting unicast and multicast traffic, respectively. In one embodiment, the client-server communication link 225 includes a satellite communications link. It will be appreciated that satellites may effectively broadcast all their downstream traffic to all receivers that are tuned to a particular carrier, beam, etc. As such, unicasting or multicasting to one or more user systems 210 may, in fact, involve broadcasting the data over the satellite link and also broadcasting control data to direct receivers to either accept or ignore relevant portions of the broadcast data. Notably, while some system resources may be expended in setting up a multicast service flow 265 and in related logistics, it "costs" the satellite communications system substantially the same bandwidth resources to send a packet to one user system 210 or to all user systems 210 (e.g., on a particular spot beam).

It is worth noting that, when the client-server communication link 225 includes multiple multicast service flows 265, the multicast service flows 265 may be configured in various ways. In various embodiments, for example, the multicast service flows 265 are configured to each communicate at a different modcode point, on a different spot beam, and/or on a different carrier. This may allow for more efficient communication of traffic to groups of user systems 210 having particular characteristics. For example, if certain traffic is determined to be destined for a user system 210 capable of communicating at a particular modcode point, the traffic may be multicast on a multicast service flow 265 that operates at or near this modcode point for maximum efficiency (e.g., rather than at the lowest modcode point needed to transmit to all user systems 210 in the multicast group). While this may, in certain cases, cause some of the user systems 210 in the multicast group to be unable to reliably receive all the multicast data, there may still be an overall improvement in the operation of the communications system 200.

In other embodiments, modcodes may be handled (e.g., selected, adapted, optimized, etc.) in various ways. In one embodiment, the modcode is selected according to link conditions between the server optimizer 230 and the client optimizer 220 associated with a requesting client, if any (i.e., so that at least the requesting client can reliably receive the communication). In another embodiment, the modcode is selected so that at least some threshold group (e.g., number) of clients can reliably receive the communication. In still other embodiments, the modcode is adapted to changes in link conditions between the server optimizer 230 and one or more client optimizers 220. For example, adaptive coding and modulation techniques may be used. The modcode may be adapted by estimating or monitoring link conditions from the server-side (e.g., estimating signal-to-noise ratios, bandwidth, etc.) or via feedback from the client-side. In one embodiment, the client optimizer 220 communicates information, like whether packets are reliably received, as feedback to the server optimizer 230 for dynamically adjusting the modcode. Typically, a multicast service flow 265 may be adaptively coded and/or modulated to be received by the worst-case user system 210 (e.g., the user system 210 manifesting the highest average packet loss). By grouping users as a function of certain link conditions, it may be possible to increase the overall throughput of the system by communicating with certain groups of users 110 at higher modcodes, and with other groups of users 110 at lower modcodes (e.g., using a multi-carrier approach, or multiple multicast service flows).

As discussed more fully below, user groupings may be determined according to various types of user preferences. Certain user preferences may be supplied by the users 110, for example, through subscription routines, surveys, portals, etc. Other user preferences may be derived from user-provided preferences, usage habits, and in other indirect ways. For example, it may be predicted that a first fan who subscribes to ten different NASCAR-related content feeds may consider a popular new NASCAR movie to be valuable content. It will be appreciated that many types of groupings are possible, and the groupings may be used in many different ways. For example, broadcasters 130 may provide the group of NASCAR fans with certain NASCAR-related programming, different content listings, advertisements and specials for NASCAR merchandise, etc. Similarly, broadcasters 130 may determine that NASCAR fans are likely to request a certain genre of on-demand movies. The groupings may also be used for other types of predictions, for demand shifting, and for facilitating other types of functionality.

Figure 3:
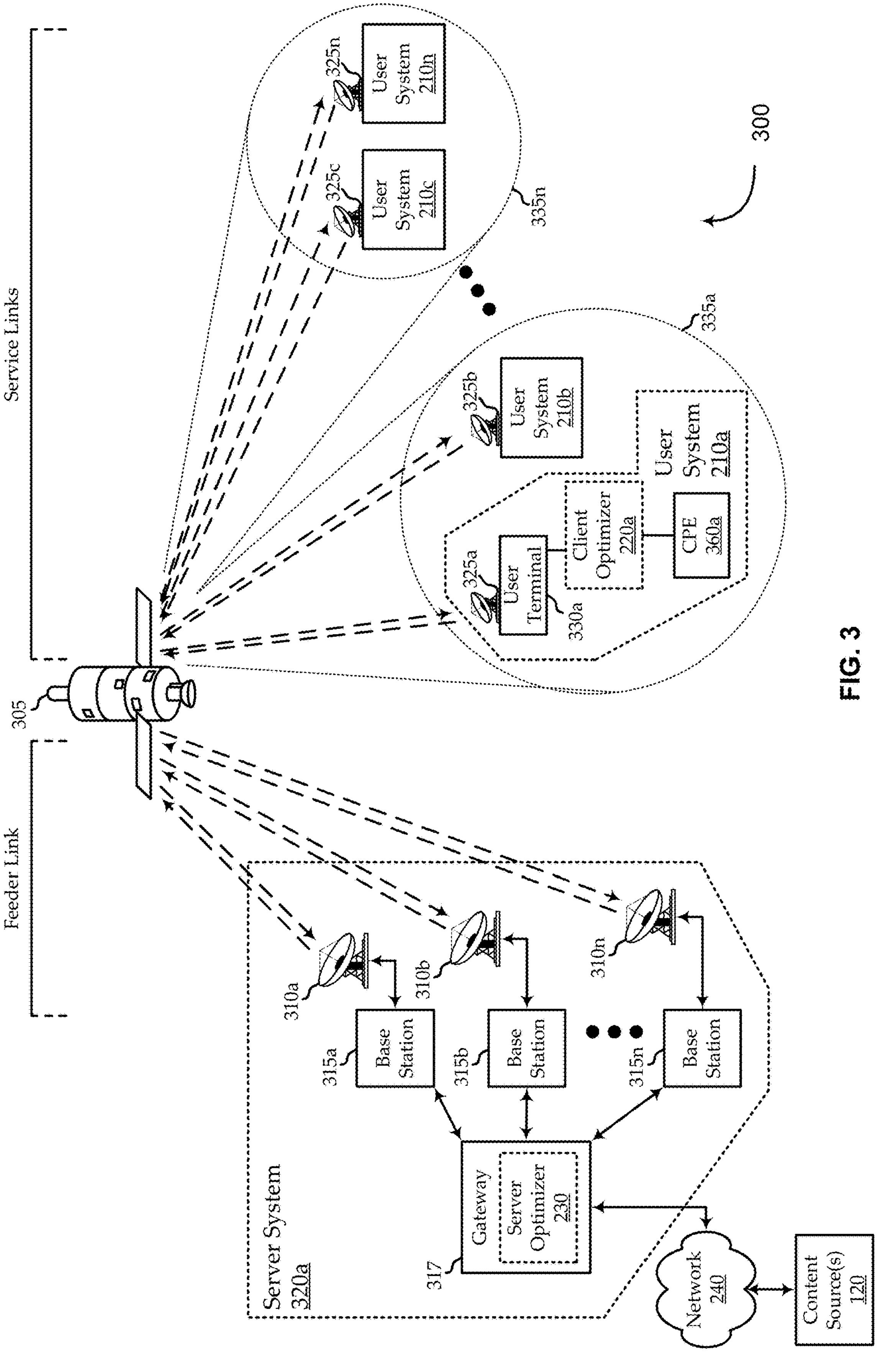
FIG. 3 shows a block diagram of an embodiment of a satellite communications system having a server system in communication with multiple user systems via a satellite over multiple spot beams, according to various embodiments.

For the sake of illustration, FIG. 3 shows a block diagram of an embodiment of a satellite communications system 300 having a server system 320 in communication with multiple user systems 210 via a satellite 305 over multiple spot beams 335, according to various embodiments. The server system 320 may include any server components, including base stations 315, gateways 317, etc. A base station 315 is sometimes referred to as a hub or ground station. In certain embodiments, as described below, the base station 315 has functionality that is the same or different from a gateway 317. For example, as illustrated, a gateway 317 provides an interface between the network 240 and the satellite 305 via a number of base stations 315. Various embodiments provide different types of interfaces between the gateways 317 and base stations 315. For example, the gateways 317 and base stations 315 may be in communication over leased high-bandwidth lines (e.g., raw Ethernet), a virtual private large-area network service (VPLS), an Internet protocol virtual private network (IP VPN), or any other public or private, wired or wireless network. Embodiments of the server system 320 are in communication with one or more content sources 120 via one or more networks 240.

In some embodiments, the gateway 317 is configured to implement relatively simple routing functions. For example, the gateway 317 may receive traffic from the network 240, determine which of the base stations 315 should receive the traffic, and route the traffic accordingly. In other embodiments, the gateway 317 performs relatively complex functions, including, for example, network security, accounting, content acceleration, trend analysis, signal processing and/or encoding, etc. In still other embodiments, the gateway 317 and the base stations 315 share some or all of the desired network functionality. For example, it may be desirable to perform certain functions in one location, perform other functions in a distributed manner, and perform still other functions in a redundant manner.

As traffic traverses the satellite communications system 300 in multiple directions, the gateway 317 may be configured to implement multi-directional communications functionality. For example, the gateway 317 may send data to and receive data from the base stations 315. Similarly, the gateway 317 may be configured to receive data and information directed to one or more user systems 210, and format the data and information for delivery to the respective destination device via the satellite 305; or receive signals from the satellite 305 (e.g., from one or more user systems 210) directed to a destination in the network 240, and process the received signals for transmission through the network 240.

In one embodiment, the satellite communications system 300 includes a number of gateways 317 distributed over a large geographic region. Each gateway 317 is in communication with the network 240 via a high-speed connection (e.g., a dedicated high-bandwidth fiber link). Each gateway 317 is also in communication with, and handles communications for, up to twenty base stations 315 (e.g., twenty feeder links). Each of the twenty base stations 315 is configured to service up to four user links by communicating content for those user links to the satellite 305 using an antenna 310.

In various embodiments, one or more of the satellite links are capable of communicating using one or more communication schemes. In various embodiments, the communication schemes may be the same or different for different links. The communication schemes may include different types of coding and modulation combinations. For example, various satellite links may communicate using physical layer transmission modulation and coding techniques using adaptive coding and modulation schemes, etc. The communication schemes may also use one or more different types of multiplexing schemes, including Multi-Frequency Time-Division Multiple Access ("MF-TDMA"), Time-Division Multiple Access ("TDMA"), Frequency Division Multiple Access ("FDMA"), Orthogonal Frequency Division Multiple Access ("OFDMA"), Code Division Multiple Access ("CDMA"), or any number of other schemes.

Embodiments of the satellite 305 may be implemented as a geostationary satellite 305, a low earth orbit ("LEO") satellite 305, or aerial payloads not in orbit and held aloft by planes, blimps, weather balloons, etc. Other embodiments could have a number of satellites 305 instead of just one. In one embodiment, the satellite 305 is configured as a "bent pipe" satellite, wherein the satellite 305 may frequency convert the received carrier signals before retransmitting these signals to their destination, but otherwise perform little or no other processing on the contents of the signals. There could be a single carrier signal for each service spot beam 335 or multiple carriers in different embodiments. Similarly, single or multiple carrier signals could be used for feeder spot beams. A variety of physical layer transmission modulation and coding techniques may be used by the satellite 305 in accordance with certain embodiments, including those defined with the DVB-S2 standard. For other embodiments, a number of configurations are possible (e.g., using LEO satellites, mesh networks, star networks, etc.).

The satellite 305 may operate in a multi-beam mode, transmitting a number of spot beams 335, each directed at a different region of the earth. Each spot beam 335 may be associated with one of the user links, and used to communicate between the satellite 305 and a large group (e.g., thousands) of user systems 210 (e.g., user terminals 330 within the user systems 210). The signals transmitted from the satellite 305 may be received by one or more user systems 210, via a respective user antenna 325. In some embodiments, some or all of the user systems 210 include one or more user terminals 330 and one or more CPE devices 360. User terminals 330 may include modems, satellite modems, routers, or any other useful components for handling the user-side communications. Reference to "users" should be construed generally to include any user (e.g., subscriber, consumer, customer, etc.) of services provided over the satellite communications system 300 (e.g., by or through the server system 320).

In a given spot beam 335, some or all of the users (e.g., user systems 210) serviced by the spot beam 335 may be capable of receiving all the content traversing the spot beam 335 by virtue of the fact that the satellite communications system 300 employs wireless communications via various antennae (e.g., 310 and 325). However, some of the content may not be intended for receipt by certain customers. As such, the satellite communications system 300 may use various techniques to "direct" content to a user or group of users. For example, the content may be tagged (e.g., using packet header information according to a transmission protocol) with a certain destination identifier (e.g., an IP address), use different modcode points that can be reliably received only by certain user terminals 330, send control information to user systems 210 to direct the user systems 210 to ignore or accept certain communications, etc. Each user system 210 may then be adapted to handle the received data accordingly. For example, content destined for a particular user system 210 may be passed on to its respective CPE 360, while content not destined for the user system 210 may be ignored. In some cases, the user system 210 stores information not destined for the associated CPE 360 for use if the information is later found to be useful in avoiding traffic over the satellite link, as described in more detail below.

In some embodiments, each user system 210 implements a client optimizer 220 that is in communication with a server optimizer 230 located in the server system 320 (e.g., in the gateway 317). The client optimizers 220 and server optimizer 230 may act to create a virtual tunnel between the user systems 210 and the content sources 120, as described with reference to FIG. 2A. In a topology, like the satellite communications system 300 shown in FIG. 3, vast amounts of traffic may traverse various portions of the satellite communications system 300 at any given time. As discussed above, at least some of the traffic traversing the network may be intercepted by the server optimizer 230 for further processing and for additional functionality. The functionality of the server optimizer 230 may also be assisted and/or exploited by other components of the server system 320 and the user systems 210.

It will be appreciated that any of the various communications systems discussed with reference to FIGS. 1-3 (or other communications systems) may be used to implement functionality described herein. Further, certain components may be included to facilitate certain functionality. For example, as discussed above, multicasting techniques may be used to provide the same content to multiple users 110 at the same time. Even where the users 110 receive the content at the same time, however, they may not desire to consume (e.g., view) the content at the same time.

Figure 4:
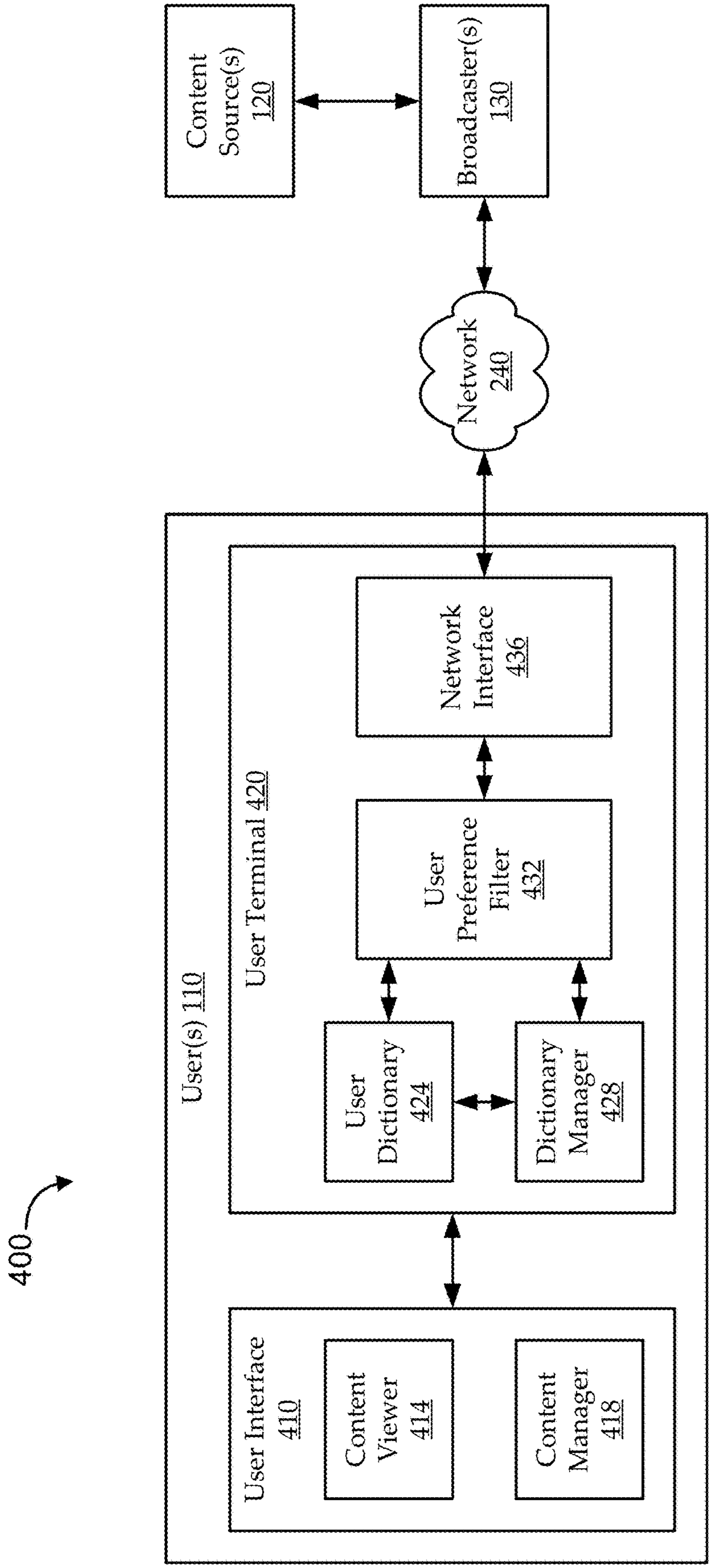
FIG. 4 shows a block diagram of an illustrative communications system for managing shared-link content using a user dictionary, according to various embodiments.

Some embodiments exploit and manage a user dictionary at least to handle requests for the same content from multiple users occurring at different times. FIG. 4 shows a block diagram of an illustrative communications system 400 for managing shared-link content using a user dictionary 424, according to various embodiments. The communications system 400 includes users 110 in communication with content sources 120 via one or more broadcasters 130 and over a network 240. In some embodiments, communications between the users 110, broadcasters 130, and content sources 120 may be as described with reference to FIG. 1.

Embodiments of the users 110 include various systems and/or components to facilitate functionality described herein. Components and systems illustrated herein may be implemented, in whole or in part, in hardware. Thus, they may include one or more Application Specific Integrated Circuits (ASICs) adapted to perform a subset of the applicable functions in hardware. Alternatively, the functions may be performed by one or more other processing units (or cores), on one or more integrated circuits (ICs). In other embodiments, other types of integrated circuits may be used (e.g., Structured/Platform ASICs, Field Programmable Gate Arrays (FPGAs), and other Semi-Custom ICs), which may be programmed. Each may also be implemented, in whole or in part, with instructions embodied in a computer-readable medium, formatted to be executed by one or more general or application specific controllers.

As illustrated, each user 110 may include (e.g., be associated with) one or more user interfaces 410 and one or more user terminals 420. Embodiments of the user interface 410 include a content viewer 414 and a content manager 418. Embodiments of the user terminal 420 include a user dictionary 424, a dictionary manager 428, a user preference filter 432, and a network interface 436. It will be appreciated that other components, arrangements, topologies, etc. are possible according to alternate embodiments, without departing from the scope of the invention. As such, the illustrated embodiment of FIG. 4 is intended to clarify the description of various embodiments and inventive aspects, and should not be construed as limiting the scope of the functions or structures of the invention.

In one embodiment, the user terminal 420 is located at a user premises, for example, as part of a set-top box, user modem, etc. One of the broadcasters 130 communicates content over the network 240 to the network interface 436 of the user terminal 420. It will be appreciated that components of the user terminal 420, including components of the network interface 436, may operate at different levels. For example, it may be useful to categorize certain functionality as occurring at a "physical layer" and a "user layer." While these layer categorizations each may carry certain meanings to some of ordinary skill in the art (sometimes with variations between brands and types of components), those meanings are not intended to limit the construction of these classifiers. Rather, these classifications are intended to be broadly construed to add clarity to this description.

In particular, the "physical layer," as used herein, is intended to include lower-level functionality, including basic hardware transmission functionality, amplifiers, signal processors, etc. For example, the "physical layer" may include so-called "PHY" layer functions, low-level Media Access Control (MAC) layer functions, and similar functions, which may typically be implemented in dedicated hardware (e.g., or devices not intended to be dynamically programmed). The "user layer," as used herein, is intended to include higher-level functionality, including dynamically programmable functionality. For example, the "user layer" may include so-called "application" layer functions, some high-level MAC layer functions, and similar functions, which may be implemented in software and/or programmable hardware (e.g., a multi-purpose central processing unit (CPU), etc.). Typically, the physical layer may be capable of processing at substantially higher bandwidths than the user layer. In one embodiment, the physical layer has access to substantially the full link bandwidth (e.g., one gigabit-per-second (Gbps)), while the user layer has access only to about one-percent of that bandwidth (e.g., ten Megabits-per-second (Mbps).

For various reasons (e.g., limited capacity of the user dictionary 424), it may be undesirable or even impossible to store all content received at the network interface 436 in the user dictionary 424. As such, the user preference filter 432 may be configured to filter the types of information stored in the user dictionary 424, for example, according to various user preferences. It will be appreciated that various functional (e.g., logical) placement of the user preference filter 432 may affect its functionality. For example, it may be desirable to place the user preference filter 432 between the network interface 436 and the user dictionary 424 so that only data of potential interest to the user 110 reaches the user dictionary 424 for storage.

Further, one or more filters may be included in embodiments of the user preference filter 432, and different filters may be placed differently for different functionality. For example, as described above, different functionality may occur (e.g., or may be possible) at the user layer and at the physical layer. As such, it may be desirable to place some filtering components at each layer, as described more fully below with reference to client-side filtering embodiments.

In some embodiments, content that passes through the user preference filter 432 is stored in the user dictionary 424, as managed by the dictionary manager 428. In various embodiments, the dictionary manager 428 performs different functions, including further filtering, indexing, tagging, etc. Certain embodiments of the dictionary manager 428 use dictionary coding techniques to manage the user dictionary 424 as a delta dictionary or similar type of storage. For example, some embodiments may manage the user dictionary 424 as an object cache (e.g., a "squid" cache), while other embodiments may manage the user dictionary 424 as a byte cache (e.g., a dictionary of unordered byte sequences).

Other types of storage management may be included in other embodiments and may be implemented, for example, by the dictionary manager 428 and/or the user preference filter 432. For example, a user 110 may set preferences (e.g., or have preferences set by a service provider, have preferences dynamically adjusted according to usage or other factors, etc.) as to storage capacity designated for certain types of use. In one embodiment, each of a number of subscription channels is associated with a bin (e.g., space within the user dictionary 424) having a designated capacity. Similarly, a service provider may set certain bins in the user dictionary 424 for pre-positioning certain types of data that is likely to be requested by users 110. For example, the first Megabyte of data for the top one-hundred movie downloads of the day may be anticipatorily multicast by broadcasters 130 to all users 110 and stored in a designated bin in their respective user dictionaries 424. Bins (e.g., or the atoms stored therein) may also be associated with factors, such as time to live (e.g., only keep items from this channel in the user dictionary 424 bin for three hours), priority (e.g., only accept additional items on this channel if they are newer (or more popular, etc.) than the items already in the user dictionary 424), etc. Of course, any other useful types of factors are possible according to various embodiments.

User interaction with content received by the user terminal 420, including content stored (e.g., or represented) in the user dictionary 424, is accomplished through the user interface 410. For example, the user interface 410 may be a computer program or other system through which data is accessed, viewed, or managed, and may be located on the same device or other device in the user premises with connectivity to the user terminal 420. Embodiments of the user interface 410 allow the user 110 to view stored or live broadcast content, and may provide certain optimizations of user interactions with the content (e.g., to optimize fulfillment of user interests).

In some embodiments, the content manager 418 monitors user 110 behavior. For example, the content manager 418 may record what contents have been viewed, at what time, how long the user 110 interacted with the content, etc. Typically, the content manager 418 is configured to monitor the user 110 behavior in a substantially transparent manner, for example, such that the user's 110 experience is substantially unaffected by the monitoring. In other embodiments, the content manager 418 allows active user 110 inputs to direct certain functionality. For example, the user 110 input may be used at least partially to express preferences, manage what is stored in cache, or otherwise provide feedback about users' 110 interests.

Embodiments of the dictionary manager 428 in the user terminal 420 may interact with the content manager 418 to exploit active and passive types of user 110 interaction with content. In one embodiment, the user preferences and/or other information from the content manager 418 are used by the dictionary manager 428 to help determine content retention, prioritization, etc. For example, user preferences may dictate the order in which atoms are overwritten in the user dictionary 424 as fresh data arrives. A video file may be deleted once it has been has been viewed, when other content is received that is determined to be a replacement (e.g., according to content, priority, etc.), etc. In certain embodiments, the dictionary manager 428 also controls the user preference filter 432 at least partially based on feedback received from the content manager 418.

Figure 5:
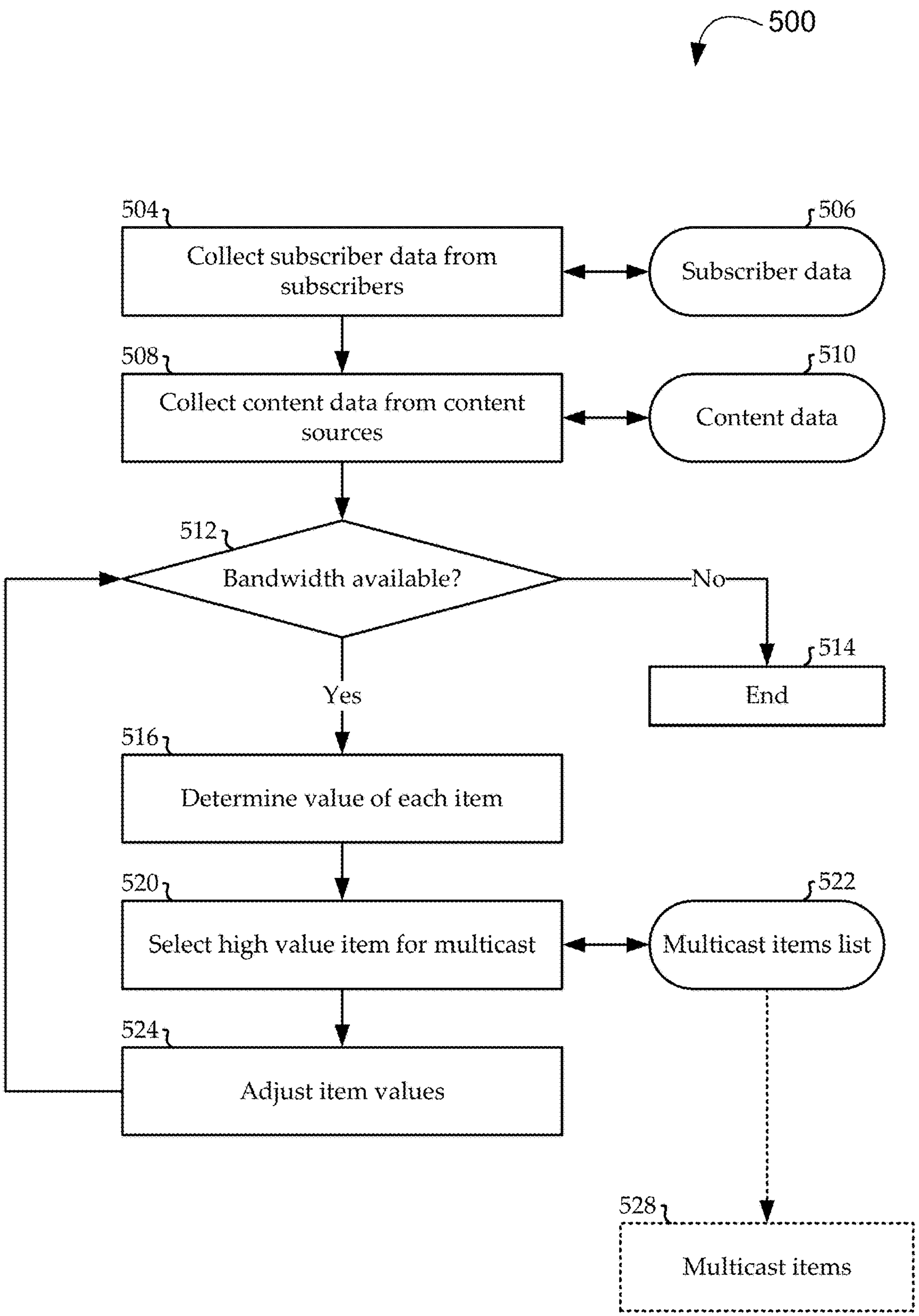
FIG. 5 shows a flow diagram of a method for determining which content to multicast, according to various embodiments.

The user terminal 420 (e.g., or some other component) may be configured to collect data that may be relevant to improving multicasting determinations. The collected information may be communicated (e.g., uploaded over the network 240) to the broadcasters 130 for use in improving multicasting determinations. FIG. 5 shows a flow diagram of a method 500 for determining which content to multicast, according to various embodiments. In some embodiments, the multicast determinations are made by the broadcasters 130 based at least partially on collected feedback from the users 110.

Embodiments of the method 500 begin at block 504 by collecting subscriber data 506. For example, user preferences may be gathered from the dictionary manager 428 and/or the content manager 418, a state of the user dictionary 424 may be determined and/or maintained, and/or other information may be collected as part of the subscriber data 506. At block 508, content data 510 may be collected from one or more content sources 120. For example, metadata and/or other header information, digital rights management (DRM) information, indexing information, and/or other types of information may be collected as content data 510. In some embodiments, the subscribers are users 110 that have subscribed to a particular content delivery (e.g., broadcast or multicast) service, and the content data 510 is collected from content sources 120 that have agreed to participate in the service.

It is worth noting that the total amount of data available from all the participating content sources 120 may typically exceed the amount of bandwidth available to the broadcasters 130 for delivering that content to subscribers. Embodiments of the method 500 determine which of the content to offer through the content delivery service according to blocks 512 through 524.

In some embodiments, a threshold determination is made at block 512 as to whether sufficient bandwidth is available for offering a particular content atom through the content delivery service. For example, the determination at block 512 may include determining whether a multicast session stream is available on a shared link that services the appropriate users 110. If the determination at block 512 is that sufficient bandwidth is not available for offering the content atom through the content delivery service, the method 500 may end at block 514. Alternately, if the determination at block 512 is that sufficient bandwidth is not available for offering the content atom through the content delivery service, the method 500 may move to evaluating other content atoms. For example, the bandwidth determination of block 512 may, in some embodiment, include such additional considerations as opportunity cost of using an available session stream, whether certain contractual obligations are associated with different bandwidth allocations, etc.

If the determination at block 512 is that sufficient bandwidth is available for offering the content atom through the content delivery service, a value of the content atom may be determined at block 516. The atom value may be evaluated according to various factors, including how well the atom's corresponding content data 510 matches subscriber data 506 (e.g., how well it fits preferences of large numbers of users 110), etc. One illustrative factor may be various terms and/or conditions associated with the content. DRM and/or other types of obligations may be associated with the content atom, making the content atom more or less acceptable to the subscribing users 110 and/or to the broadcasters 130. For example, a subscriber may not want advertising displayed and an atom may require payment based on advertising revenues, or a subscriber may not have access to content from a particular subscription service or may not be interested in paying a premium for such an atom.

Another illustrative factor may be a derived score for the content based, for example, on metadata and/or other header information. In one embodiment, subscribers specify interests through various types of filters. Content metadata may include information about the content provider, the content data, the time stamp, and/or other information describing the content atom. This metadata may be matched against the filters (e.g., as a list of queries) and a score may be determined as for how well the content atom matches the subscriber preferences.

Yet another illustrative factor may be a derived score for the content based on sources of information about the content external to the actual content sources 120. For example, search engines may rank content, services may aggregate reviews and/or other information, services may associate content information to content files (e.g., a movie file may be associated by a service with information on the title, ranking, box office collections, cast, director, production year, etc.), etc. In certain embodiments, the external score may be derived from or influenced by scouts, as described below.

Still another illustrative factor may be a derived score for the content based on popularity of previous atoms from the same content provider 120. For example, the content delivery service may include support for multiple user groups. If an atom is previously sent to other groups, the popularity with those groups may be assessed and fed back for use in influencing this score.

Another illustrative factor may value a content atom according to other atoms already in user dictionaries 424. If a content atom is similar or identical to other atoms already in a user dictionary 424, it may be less valuable to the corresponding user 110. If a subscriber's user dictionary 424 is completely stale, the importance of fresh data may increase. If a subscriber's user dictionary 424 is already full with new content, an atom may be considered less valuable. Notably, in some embodiments, broadcasters 130 are in communication with one or more dictionary models that either maintain a copy or a representation of user dictionaries 424 to facilitate these types of determinations.

Yet another illustrative factor may be the history of a content atom. For example, the value of a content atom may be determined to decrease if particular users 110 previously received the content atom and removed it from their user dictionaries 424. Alternately, if users 110 have a tendency to repeatedly access certain types of content, those types of content atoms may be deemed more valuable.

Still another illustrative factor may be user priority. In some embodiments, users 110 may be able to generate filters, queries, or other preference indicators to indicate the relative importance of different atoms. Using these preference indicators may encourage more important atoms to be broadcast.

Even another illustrative factor may relate to a number of users 110. The number of users 110 may include the number of users 110 sharing a relevant forward link, the number of users 110 having matching preferences, etc. In some embodiments, other factors are used to find an accumulated value for the content from all users 110 counting in the number of users 110 (e.g., all users 110 sharing the forward link).

Another illustrative factor may relate to minimum guarantees. In some embodiments, the content delivery service includes minimum guarantees to subscribers of a certain amount of targeted content. For example, this may ensure that users who prefer less popular content still receive some amount of fresh data. In other embodiments, the content delivery service includes minimum guarantees for content sources 120. For example, content sources 120 partnering with broadcasters 130 may receive guarantees that a minimum amount of their content will be broadcast each day.

At block 520, the highest value atoms (e.g., according to the factors described above) are placed in a multicast list 522. In some embodiments, at block 528, the atoms in the multicast list 522 are multicast to appropriate subscribing users 110. In other embodiments, the multicast list 522 continues to be refined. For example, the multicast list 522 may effectively be a queue, and atoms waiting in the queue may continue to be reevaluated substantially until they are pulled from the queue for multicasting at block 528.

For example, in some embodiments, values of atoms in the multicast list 522 are adjusted at block 524. For example, the value of each atom in the multicast list 522 may be adjusted according to the impact of the selected atom on other atoms in the list, or vice versa. In one embodiment, multicasting a content atom may satisfy the needs of some users 110, such that similar atoms may be less valuable to those users 110. In another embodiment, multicasting an atom may cause certain users' 110 user dictionaries 424 to be more full with fresher content, which may shift priority to filling the preferences of users 110 who have emptier user dictionaries 424 and/or staler content.

In some embodiments, after this adjustment at block 524, portions of the method 500 may be repeated. For example, the method 500 may return to block 512 to determine whether bandwidth is still available. The method 500 may continue until the multicast sessions (e.g., or a broadcast schedule or some other limited schedule resource) is filled. Embodiments of the method 500 may include additional optimizations for generating the multicast list 522. In one embodiment, the method may begin from the previous day's calculations and evaluate changes in available content, content data 510, subscriber data 506, etc. to avoid repetitious calculations. In another embodiment, the number of content atoms that need to be searched in each iteration of the method 500 is reduced by sorting according to scores given in the previous iterations of the method 500.

It will be appreciated that provision of content to users 110 according to various embodiments may be affected in different ways by different entities and/or by different systems and components. Broadcasters 130 may determine which content atoms from which content sources 120 to include in their broadcast (e.g., or multicast) service. For example, the multicast list 522 may be substantially continually updated, refined, etc. as fresh content or user 110 preferences change over time. After receiving the content at the user terminal 420, one or more layers of user preference filters 432 may affect what atoms are stored in the user dictionary 424 and/or passed on as live content to the user interface 410 for viewing. Atoms stored in the user dictionary 424 may continually be evaluated for deletion (e.g., or archival, or similar) by the dictionary manager 428. In some embodiments, even the content viewer 414 is configured to contribute to the determination which atoms are presented to the user 110 and how those atoms are presented.

Figure 6:
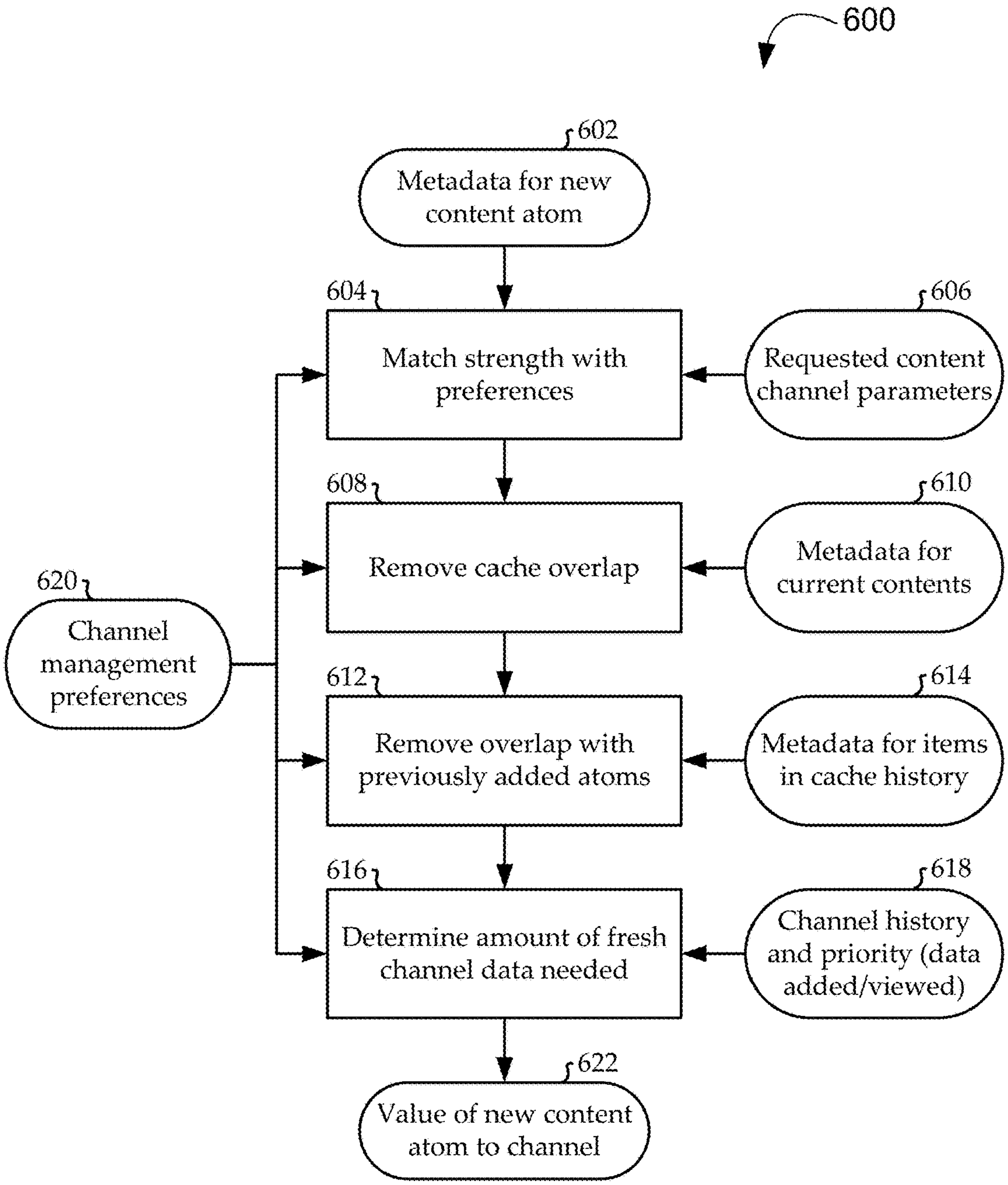
FIG. 6 shows a flow diagram of an illustrative method for determining whether to add an atom to a channel, according to various embodiments.

According to some embodiments, channels may be created as sets of atoms for consumption by multiple users 110. FIG. 6 shows a flow diagram of an illustrative method 600 for determining whether to add an atom to a channel, according to various embodiments. Embodiments of the method 600 begin at block 604 with an initial determination of the value of the atom with respect to the channel. As described above, there may be many different ways of determining the value of a particular atom.

In some embodiments, the channel is being generated according to particular requested content channel parameters 606. For example, the requested content channel parameters 606 may indicate that popular video clips about a particular subject should be part of the channel. It is worth noting that embodiments of the requested content channel parameters 606 differ from other types of parameterization (e.g., as implemented by search engines) in several ways. For example, while search queries may typically seek a single correct response, a channel may assemble a variety of atoms with different characteristics. Further, the requested content channel parameters 606 may be more complicated than normally used for search engines, as a single set of request parameters may select thousands of content items over a period of years.

At block 604, atom metadata 602 for the new atom may be received and evaluated against the requested content channel parameters 606 as part of the initial value determination. As used herein, "metadata" is intended to be construed broadly to include any descriptive types of information that may be associated with the atom. Depending on the type of atom, different types of metadata 602 may be available.

For example, the atom metadata 602 may relate to the content source 120 (e.g., the channel may express preferences for particular content providers, such as a preferred news source or video provider), DRM tags (e.g., viewing requirements of the content provider may affect whether a user is interested in an item, for example, whether the channel excludes pay-per-view content), timestamps (e.g., dates or times when the content was generated, for example, whether the channel is interested only in breaking news or new releases), external gauges (e.g., a broadcaster 130 may have ways to rank the popularity or appropriateness of content, such as the way a search engine may factor references from other sites, hit rates, use of frame titles, and other variables into its ranking system), language or location information (e.g., the channel may prefer content authored in specific languages or originating from specific geographic locations), content-specific items (e.g., 'artist' for a music clip, 'topic' for a news item, parameters and keywords associated with different types of content, etc.), etc.

In certain embodiments, various types of content sets may also be established. For example, content sets may be established as really simple syndication (RSS) feeds, webpages with associated (e.g., embedded) content or recursive sets of links, etc. Embodiments may exploit these types of content sets for generating channels. Some embodiments of generating and handling content set data are described in U.S. patent application Ser. No. 12/685,729, titled "CONTENT SET BASED DELTACASTING," filed on Jan. 12, 2010; and U.S. patent application Ser. No. 12/685,920, titled "CONTENT SET BASED PRE-POSITIONING," filed on Jan. 12, 2010; both of which are hereby expressly incorporated by reference in their entirety for all purposes.

In some embodiments, the initial value determination is determined or adjusted according to one or more other factors. At block 608, the method 600 may seek to remove atoms from the channel when similar atoms are already stored in a user dictionary 424 (e.g., according to a dictionary model, feedback from the user terminal 420), etc. In one embodiment, metadata for current contents 610 of user dictionaries 424 are evaluated at block 608 to check for overlaps. For example, the value of an atom may be decreased by the presence of similar items in the user dictionary 424.

At block 612, the method 600 may further seek to remove overlap between the new atoms in the channel and atoms previously stored in user dictionaries 424 (e.g., or other atoms previously multicast for live viewing). In one embodiment, metadata for items in a cache history 614 is consulted to find overlaps in block 612. For example, even if an atom is not currently in a user dictionary 424 (e.g., as determined in block 608), it may still be undesirable to re-communicate the atom if the atom was previously communicated to and flushed from a user terminal 420. Notably, much of the multicast content may include older atoms, which may involve tracking a history (e.g., long term) of the use of the atom. The value for multicasting the atom may be decreased if the atom has previously been multicast, and the value in a user dictionary 424 may be decreased if the atom has already been viewed (of course, previous viewing of the atom may alternately indicate an increase in value in certain cases). At block 616, the method 600 may evaluate the freshness of data included in or provided by the channel. For example, the value of supplying data for a channel may be increased if no data has been recently added to the channel. Of course, other considerations are possible for refining channel content. For example, some embodiments may evaluate certain competing interests. For example, when determining the list of atoms to multicast (e.g., for pre-positioning in user dictionaries 424 for live viewing), a broadcaster 130 may evaluate, not just how an atom matches a set of preferences from a user 110, but how multicasting the atom would increase the overall level of satisfaction of the requirements of all preferences of all users 110. Another consideration may relate to preferences of an amount of channel content wanted (e.g., by users 110, by broadcasters 130, by content providers 120, etc.). For example, the capacity of a user dictionary 424 may be a finite resource, and a subscriber may only want a finite amount of content for a particular channel, so as to allow space for other channels.

In some embodiments, these and/or other considerations are affected by channel management preferences 620. In one embodiment, the channel management preferences 620 affect (e.g., specify) an amount of similarity for a channel. For example, the channel may want to emphasize variety, such that only one news clip covering a particular topic is included. In other cases, the channel may want all possible matches with the content parameters, even if similar to other atoms already in user dictionaries 424. In another embodiment, the channel management preferences 620 indicate (e.g., along with a viewing history of the subscriber 618) relative targets for the amount of fresh data to be cached each channel. The value of atoms for channels under their target may, for example, be higher than for those that have already reached their target.

When all the appropriate evaluations have been made, the result of the method 600 may be a value of the atom with respect to the channel 622. In some embodiments, the value for an atom is checked against all channels, and the value may increase if it has value to multiple channels for a subscriber. For example, the atom may be pre-positioned in the user dictionary 424 and used, from the user dictionary 424, to present channel content to the user 110 (e.g., via the user interface 410).

Figure 7:
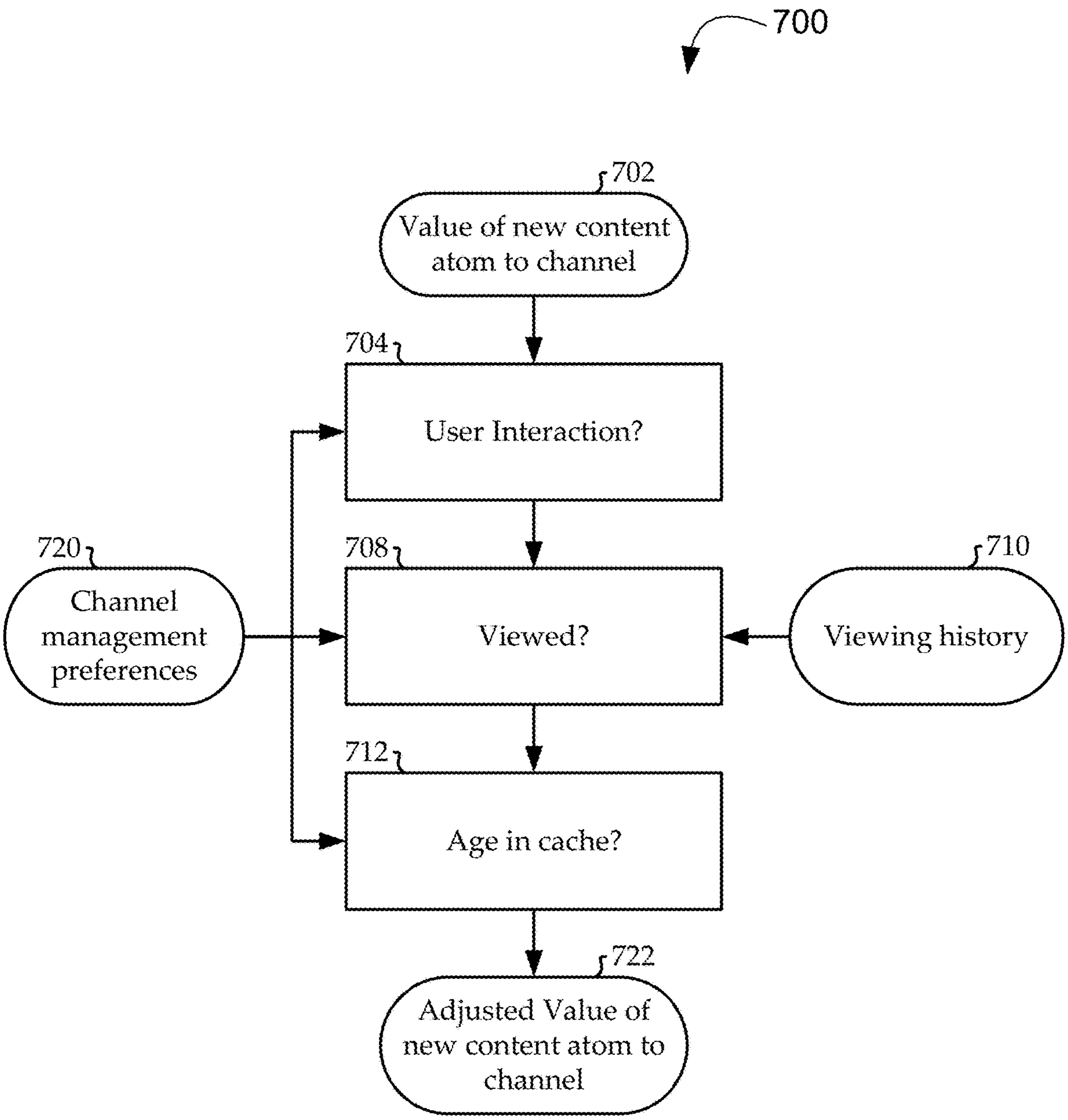
FIG. 7 shows a flow diagram of an illustrative method for adjusting the value of the atom according to an opportunity cost of removing atoms from the user dictionary, according to various embodiments.

In some embodiments, the value of an atom is adjusted according to opportunity costs relating to atoms already in the user dictionary 424. For example, where user dictionary 424 capacity is limited, adding atoms to the user dictionary 424 for a particular channel may cause other atoms for that channel to be removed from the user dictionary 424. FIG. 7 shows a flow diagram of an illustrative method 700 for adjusting the value of the atom according to an opportunity cost of removing atoms from the user dictionary 424, according to various embodiments. In some embodiments, the method 700 operates as another consideration used by the method 600 of FIG. 6 to evaluate whether to add or remove atoms from a channel for multicasting.

According to some embodiments, the method 700 begins with a baseline atom value 702. The baseline atom value 702 may be any useful value determination for the atom, such as a default value, a past value, or the value of the atom with respect to the channel 622 determined by the method 600 of FIG. 6. Some embodiments of the method 700 adjust the baseline atom value 702 to generate an adjusted atom value 722, according to one or more considerations.

At block 704, according to one illustrative consideration, user preferences may be evaluated to determine whether specific parameters are attached to an atom likely to be replaced (e.g., flushed from the user dictionary 424 if the new atom is added to the user dictionary 424). For example, the user may have manually entered any preferences with respect to the atom's lifetime. This might be a request to delete, or a request to keep it in the user dictionary 424 for future viewing.

At block 708, according to another illustrative consideration, the method 700 may determine whether the atom likely to be replaced has previously been viewed. In some embodiments, a viewing history 710 for the subscriber (e.g., or the subscriber's family, or any other useful history) may be maintained or received. For example, viewing that occurs in the user interface 410 may be monitored and recorded to generate the viewing history 710.

At block 712, according to still another consideration, the method 700 may evaluate the age in the user dictionary 424 of an atom likely to be replaced. Atoms that have been in the user dictionary 424 for a long time may be considered less valuable. Further, different types of atoms may be associated with different aging preferences. For example, a breaking news feed item may age faster than a video clip of a trailer for a blockbuster movie.

As in the method 600 of FIG. 6, some considerations (e.g., as in blocks 704, 708, and 712) can be affected by one or more channel management preferences 720. The channel management preferences 720 may be the same or different from the channel management preferences 620 discussed with reference to FIG. 6. In one embodiment, the channel management preferences 620 specify how much the value of an atom is affected by whether the atom has been viewed.

It will be appreciated that, even with the various considerations discussed with reference to FIGS. 5, 6, and 7, it may be difficult or impossible to multicast only content that precisely matches the preferences of all users 110. Additional information from additional sources may be used in some embodiments to further refine those determinations. For example, as mentioned with references to FIG. 5, evaluating whether to include a particular atom in a content delivery service may be influenced by sources of information about the content external to the actual content sources 120, like scouts.

In some embodiments, a scout provides an alternative way to add content to a channel by recommending specific atoms rather than using general search criteria. For example, requested content channel parameters 606 may specify a preference for atoms listed by a scout (e.g., by scouts in general, by a particular scout, by highly rated scouts, etc.). The list may be provided via a link that contains references to specific atoms. It may provide either a Boolean recommendation (yes or no), a ranking (specifying the scout's rating of this content), or some other useful indicator for each atom.

The scout's latest recommendations may then be part of the preference parameters used in evaluating content if the atom being evaluated is on the scout's list. In one embodiment, a particular scout's recommendation may be so highly valued that the preference result effectively follows the recommendation. In another embodiment, the scout recommendations are used as one of many factors considered in the preference matching.

Some embodiments encourage the use of scouts, as they may expedite the process of finding content so that available bandwidth is used more efficiently. For example, scouts may allow individual users to find data they like faster, so that they achieve a higher level of enjoyment with fewer downloads. The scouts may also increase the re-use of content, as many subscribers may follow the recommendations of the same scout and thus use channels that download the same content. In various embodiments, scouts may recommend any type of atom, such as videos, music, news, or any other interest. Scouts may effectively function as a personalized search engine in certain cases, providing a level of content vetting that may not be possible via typical search engines. In some embodiments, a role of the scout may be similar to that currently played by critics (movie, music, literary) or by bloggers who might recommend other web sites.

It will be appreciated that, when use of scouts may save system resources (e.g., bandwidth), broadcasters 130 may encourage the use of scouts. In some embodiments, the content viewer 414 of the user interface 410 includes a portal for viewing content. For example, the portal may be implemented as part of a browser, to look like a browser, as an applet, etc. The portal viewer may implement certain functionality, such as encouraging certain user 110 behavior. For example, certain types of layouts, indicators, etc. may encourage a user 110 towards certain content over other content. In one embodiment of the portal viewer, recommended pages are included (e.g., or highlighted) to promote scouts. The recommendation pages can include information about the scout's interests and qualifications, samples of recommendations, and possibly review by subscribers of the scout's usefulness.

Other ways of encouraging the use of scouts are also possible according to other embodiments. In certain embodiments, rankings of scouts are provided. For example, popularity of a scout may be determined by the number of subscriber channels which utilize the rankings of the scout. Using rankings to pick more popular scouts may provide additional features for subscribers. For example, scout popularity may indicate that the scouts are selecting good material for their followers. Similarly, broadcasters 130 may fill more requests for the scouts who are widely followed, so that followers of popular scouts will receive more relevant atoms. Other embodiments allow searching of scout pages, for example, to assist subscribers in finding scouts whose interests match theirs.

In some embodiments, scouting lists are not generated by a single person or entity. For example, embodiments may allow groups of subscribers to create scouting lists reflecting their common interests, and use moderators, peer reviews, or other such techniques to manage the list. The scout groups may further be expanded to include reviews of content and other social interaction, including the ranking of the contributions of individual members.

In some embodiments, scouting lists are configured to provide preference matching techniques (e.g., such as those described above) with useful information. For example, a list of atoms and content rankings may be more useful if it follows a standard (e.g., predetermined or consistent) scale. Some embodiments of broadcasters 130 may provide applications (e.g., software) for generating scouting lists in an appropriate form for use in preference matching.

In certain embodiments, the broadcasters 130 may provide scouts with access to certain types of data that may be useful in developing scouting lists. For example, broadcasters 130 may provide access to lists of popular content on video or music sites, content reviews by movie or music critics, items linked by various bloggers, etc. Scouting lists and recommendations may be introduced into the broadcaster's 130 system in various ways. For example, individuals or entities may repackage scouting data into formats desired by broadcasters 130. Alternately, robots or other automated techniques may be used to capture scouting data (e.g., and convert the data into a desired format). For example, the automated techniques may use site-specific templates, such as making a parser for a music site that lists the current top music tracks. Of course, these and/or other techniques may also be configured to preserve DRM and/or other obligations relating to the content atoms.

In some embodiments (e.g., in addition to channels constructed to serve individual interests), channels are constructed to track content being broadcast. The atoms for the channel may be selected because they match the preferences of the subscribers as expressed in their selection of other channels. For example, the broadcaster can create link-driven channels based on tracking what is being sent over the broadcast link and the popularity with the viewers, based on both number of subscribers requesting the atom and the number who have viewed it.

A link-driven channel may not select content. Rather, the link-driven channel may report on what is being sent as a result of the preferences expressed in the other (i.e., non-link-driven) channels. The link-driven channels can be structured around broad interest groups that are likely to receive content, like "Hot Hip-Hop Songs" or "Current Foreign Films." In some embodiments, the selection of a link-driven channel by a subscriber does not affect what is downloaded, but may affect what is added to the subscriber's user dictionary 424.

Client-Side Filtering Embodiments

Figure 8:
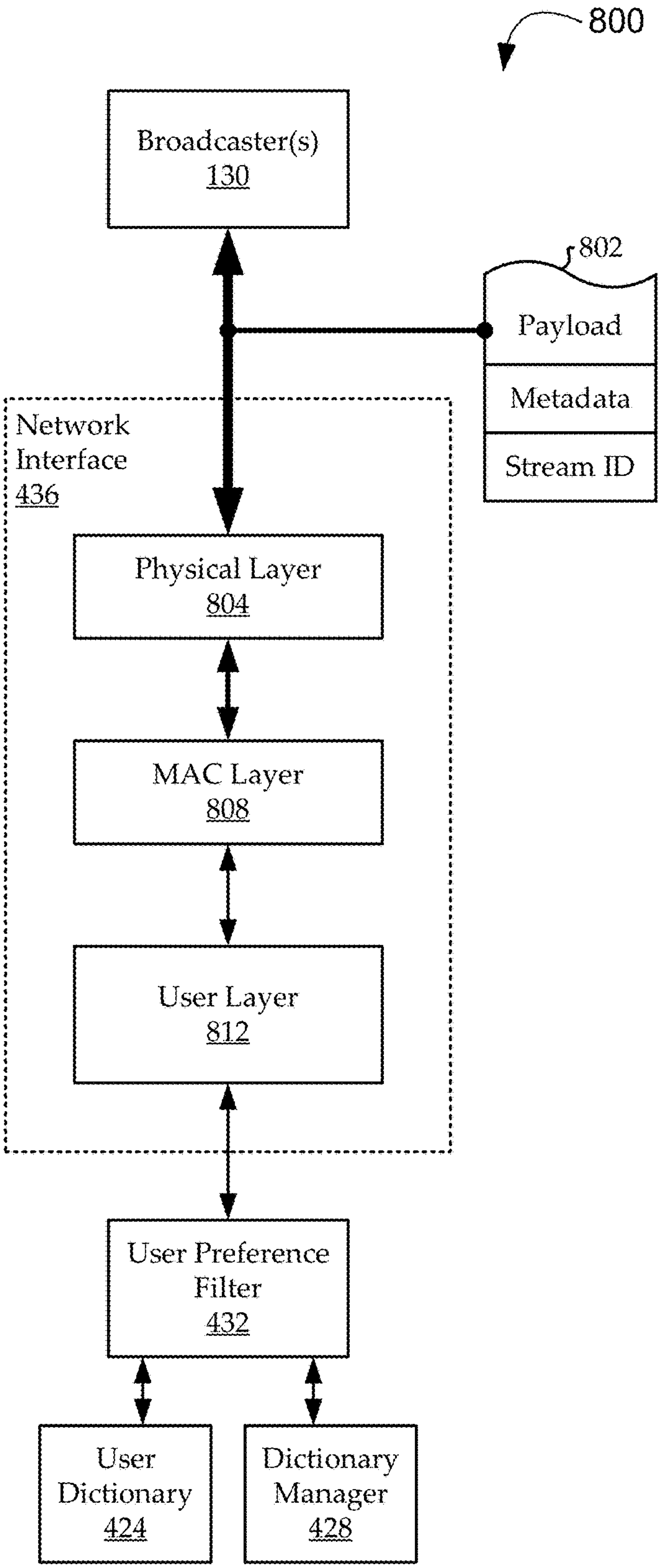
FIG. 8 shows a block diagram of certain portions of a communications system 800, like the communications system of FIG. 4, according to various embodiments.

As discussed above, user-accessible bandwidth at the user terminal 420 may be smaller than the full link bandwidth for data being received at the network interface 436 of the user terminal 420. As such, it may be difficult for the user terminal 420 to make all desired filtering and/or other processing determinations at higher layers. FIG. 8 shows a block diagram of certain portions of a communications system 800, like the communications system 400 of FIG. 4, according to various embodiments.

In some embodiments, the communications system 800 includes broadcasters 130 communicating atom data 802 to user-side components. At the user 110, the atom data 802 is received by a network interface 436, illustrated as including various layers. As discussed above, the network interface 436 may operate at least at a physical layer 804 and a user layer 812. As illustrated, there may also be intermediate layers, such as a MAC layer 808. Alternately, the MAC layer 808 and/or other layers may be considered as part of one or more of the other two layers. For example, the MAC layer 808 may be considered to include a low-level MAC that is part of the physical layer 804 and a high-level MAC that is part of the user layer 812.

In some embodiments, a signal including the atom data 802 is received from a broadcaster 130 by the physical layer 804. The physical layer 804 may receive the signal at substantially the full link bandwidth (e.g., 1 Gbps). As illustrated, the atom data 802 may effectively include units (e.g., packets), each having at least a stream identifier, metadata, and a payload. The user terminal 420 where the network interface 436 is located may be interested in a subset of stream identifiers, such that only streams of interest are passed to the user layer 812 (e.g., via the MAC layer 808). This may provide a first level of filtering, whereby uninteresting streams are removed. As such, the rate at which data is delivered to the user layer 812 (e.g., which may include Layer 3 routing, other filtering, etc.) may be less than the full link bandwidth.

Streams that pass through the network interface 436 may be further filtered by the user preference filter 432 (e.g., or other components of the user preference filter 432, where certain components are used for lower-level filtering at the physical layer). Determinations of the user preference filter 432 may affect, for example, whether an atom is stored or represented in the user dictionary 424 (e.g., according to the atom metadata). Consequently, it may be necessary or desirable for the user terminal 420 (e.g., the user preference filter 432) to process metadata for all content atoms of accepted streams.

In one embodiment, a single stream identifier is established for all atoms in a session stream (e.g., a channel or multicast stream). The user terminal 420 processes the metadata for each atom to determine whether it is interested in the atom. If so, it stores or represents the atom in the user dictionary 424. If not, it may discard the data for the atom. Notably, this approach may be undesirable in some cases. For example, if the entire broadcast stream is identified by a single stream identifier, higher layers may have to process atom data substantially at the full bandwidth of the broadcast stream. This may place undesirable and/or excessive requirements on the processing power required for those modules. Further, according to this approach, metadata may have to be processed substantially at the same time that atom data is being received, which may place additional burdens on the hardware.

In some embodiments, a substantially unique stream identifier is generated for each content atom. Those of skill in the art will appreciate that the "unique" stream identifier may be only as unique as necessary. For example, the stream identifier may be unique with respect to a certain timeframe, a certain shared forward link (e.g., spot beam), a certain content channel, etc.

In certain embodiments, one or more special stream identifiers are reserved for a stream that contains the metadata on which all user terminals 420 always listen. Each entry in the metadata stream may contain the metadata for a content atom followed by the unique stream identifier associated with that atom. In some embodiments, the stream identifier is associated with a group of atoms, rather than with a single atom. For example, a group of atoms may be associated with one content set (e.g., an RSS feed, a webpage, etc.), with one common metadata attribute (e.g., video clip file with director Quentin Tarantino).

The user terminals 420 receive the metadata entry and may send it to the user preference filter 432. The user preference filter 432 may evaluate the metadata against maintained user preferences (e.g., according to methods described above, other systems or components, etc.). If it is determined that the data should be stored or represented in the user dictionary 424 (e.g., that the atom is likely of content desirable to the user 110), the user preference filter 432 may communicate an indication to the lower layers. In one embodiment, the user preference filter 432 sends the unique stream identifier associated with the content atom to the physical layer 804 portion of the network interface 436. The physical layer 804 may then add the stream identifier to a list of stream identifiers to accept.

Figure 9:
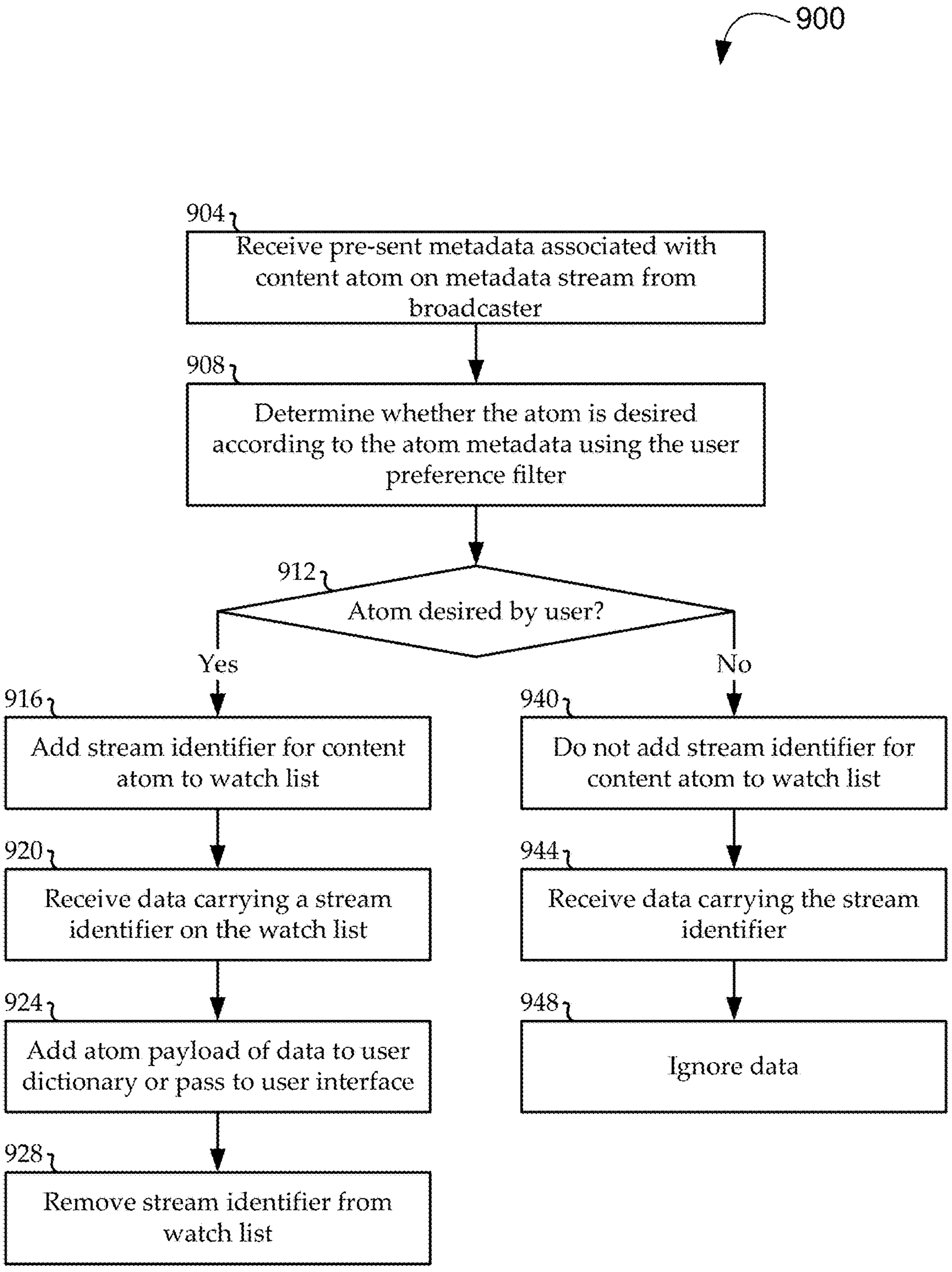
FIG. 9 shows a flow diagram of a method for using a unique stream identifier for low-level user-side filtering, according to various embodiments.

FIG. 9 shows a flow diagram of a method 900 for using a unique stream identifier for low-level user-side filtering, according to various embodiments. Embodiments of the method 900 begin at block 904 by receiving pre-sent metadata associated with a content atom on a metadata stream from a broadcaster 130. For example, a user terminal 420 receives a broadcast stream at the network interface 436 having data carrying the special stream identifier (i.e., that indicates to the user terminal 420 never to ignore that data). The network interface 436 may pass the data to the user preference filter 432 for processing.

At block 908, a determination is made as to whether the atom is desired by the user terminals 420. In some embodiments, the determination includes using the user preference filter 432 to evaluate metadata from the pre-sent data against user preferences. As illustrated by decision block 912, the method 900 may proceed differently depending on the determination in block 908.

If the determination is made at block 912 that the atom is desired by a user terminal 420, the user terminal 420 may add the unique stream identifier to a watch list at block 916 for use by the network interface 436 (e.g., the physical layer 804). It may be assumed that the broadcaster 130 sends the metadata on the metadata stream and then waits long enough to allow all the subscriber user terminals 420 to evaluate the metadata and decide if they want to accept the atom. After this interval, the broadcaster may send the content atom in association with the specified stream ID. The data carrying the stream identifier on the watch list may be received at block 920.

It is worth noting that, by using the stream identifier from the pre-sent metadata, it may be unnecessary for the broadcaster 130 to receive responses from the user terminals 420. For example, the broadcaster 130 already has associated that stream identifier with the appropriate atom and may have already determined to multicast the atom, regardless of whether individual user terminals 420 will accept the item. In alternate embodiments, various communications may transpire between the broadcaster 130 and the user terminals 420. For example, the user terminals 420 may receive the metadata, generate a unique identifier, and communicate that identifier back to the broadcaster 130. Further, responses from the user terminals 420 may factor into a determination by the broadcaster 130 of whether to multicast the atom at all.

At block 924, the atom may be added to the user dictionary 424 and/or sent to the user interface 410 (e.g., for viewing via the content viewer 414). At block 928, the user terminal 420 may remove the stream identifier from the watch list, if appropriate. For example, because the atom has already been received and stored, viewed live, etc., it may be unnecessary to continue to watch for that content identifier. Notably, removing the stream identifier from the watch list may also limit the number of stream identifiers for which the user terminals 420 are listening. Having a smaller watch list may allow for more efficient handling by the network interface 436 (e.g., at the physical layer 804).

If the determination is made at block 912 that the atom is not desired by a user terminal 420, the user terminal 420 may not add the unique stream identifier to the watch list at block 940. The data carrying the stream identifier may be received at block 944. For example, because the data is being sent on a shared link, the user terminals 420 configured (e.g., tuned) to receive data on that link may effectively receive all the data on the link, even if the data will ultimately be ignored by the user terminals 420. At block 948, the user terminal 420 ignores the data.

It will be appreciated that this technique effectively uses the user preference filter 432 to perform at least some of its filtering at the physical layer. As discussed above, this may allow the filtering to exploit the typically higher bandwidth processing of the lower layers of the network interface 436. It will be further appreciated that the technique may be used in a multi-carrier communications system to select among multiple communication channels.

In a typical multi-carrier topology, user terminals 420 are configured to access only a subset of available channels at any particular time. For example, a satellite may transmit data over multiple channels on different carriers. A user terminal 420 may only be tuned to one (e.g., or fewer than all) of the carriers, thereby having access only to the channels on those carriers. In some embodiments, the metadata stream is configured to include both the unique stream identifier and a carrier (e.g., or channel) identifier indicating which channel or carrier will be used to carry the atom.

The metadata stream may be communicated (e.g., simulcast) over all carriers, such that all user terminals 420 will be able to receive the metadata stream, regardless of to which carrier(s) the user terminals 420 are tuned. If the user preference filter 432 determines according to the metadata stream that the user terminal 420 is interested in an atom, it can switch its receiver to listen to an appropriate carrier which will transmit the content atom.

It is worth noting that the switch between carriers may be performed in some embodiments without notifying the respective base station (e.g., or similar) that is broadcasting or retransmitting the signal. It is further worth noting that, when a receiver can only process a subset of the broadcast data, it may not be able to receive multiple items delivered at the same time or on different carriers. It is even further worth noting that, if hardware resources restrict the number of items a user terminal 420 can receive at the same time, the user terminal 420 can continue to monitor the metadata stream. If the metadata indicates that an atom of significantly higher value is about to be transmitted than an atom in progress, the user terminal 420 can abort the current transfer so that it can receive the higher value atom.

In some embodiments, the broadcaster 130 may be aware, in scheduling content, of which atoms will be accepted by each user terminal 420. After assembling the list of atoms to broadcast, this data may be used to optimize the scheduling of content items, the assignment of items to different channels, the assignment of multicast groups, the assignment of modcodes, etc. For example, this may minimize the number of cases where a user terminal 420 will miss data in which it is interested. This may also allow further optimization of the communication links involved. For example, careful choice of carriers, multicast groupings, and modcodes may allow bandwidth savings in some cases.

Channel Sharing and Cache Synching Embodiments

A trend in content consumption is the integration of that content with various types of social networking. In one example, many broadcasters 130 have begun to supplement broadcast content with substantially concurrent content offered through broadcaster websites, blogs, etc. In another example, fans of certain content may communicate substantially in real time about the content through social networking websites, chat portals, etc. During a popular television program or sporting event, for instance, official or unofficial groups of users may hold online discussion forums to comment on the program or event as it unfolds.

Many of the embodiments described above discuss use of user dictionaries 424 to enhance communications system functionality. One benefit of pre-positioning (or otherwise storing) content at user terminals 420 is that users 110 may be able to access more desired content more quickly. Another benefit may be that broadcasters 130 may be able to enjoy certain resource benefits of broadcasting, while allowing users 110 to consume the content outside of the broadcast context (e.g., in a time-shifted manner). Notably, in some cases, local consumption of content (e.g., from a subscriber's user dictionary 424) may be in tension with a subscriber's desire to exploit the social networking benefits of a concurrent, shared viewing experience.

As discussed above, embodiments may allow users 110 to receive large amounts of content that matches their interests without having to pick each item individually. According to some embodiments, these channels may be shared with other users. For example, when channels are shared, subscribers may be able to choose among channels developed by others with similar interests, thereby further enhancing their experience. In some cases, instead of picking programs or individual atoms, the subscriber can try different channels until they find ones that best match their interests. Of course, many types of channel creation and/or sharing are possible. In one embodiment, subscribers choose among shared channels that use selection and delivery times of traditional television networks (e.g., CBS, FOX, etc.). In another embodiment, subscribers choose among channels created by any individual or group that has posted a shared channel.

It will be appreciated that sharing of channels may serve a separate interest for broadcasters 130, as this may increase the number of people consuming each downloaded atom. As such, broadcasters 130 may want to encourage sharing. Various types of portals, applications, etc. may be used to search the shared channel content. In one embodiment, a personal portal (e.g., viewed via each subscriber's content viewer 414) provides pages linked to the personal portals that post channels for sharing and information about the channels. The shared channels may be presented along with descriptive info, summaries, lists of included items, popularity, rankings, amount of fresh content added each day, etc., where appropriate, to facilitate subscriber selections. This list can be searched, sorted, and reviewed.

Notably, because the shared channels include content from user dictionaries 424, it may be important to synchronize the channel content and viewing to facilitate the shared viewing experience. As such, various embodiments implement channel synchronization for groups of viewers in one or both of the following ways. First, channels may be synchronized (e.g., viewers may select to synchronize their channels) by substantially synchronizing storage of channel content in their respective user dictionaries 424. Second, channels may be synchronized by ensuring that playback of substantially the same content at substantially the same time is occurring for viewers "tuned in" to the channel.

In some embodiments, synchronization allows users 110 to share the experience of watching the same content, possibly at the same time. This sharing might also include interactive applications running concurrently, such as through chat or other applications or techniques handled through private network connections. This social experience may be valuable to the subscribers, and the broadcasters 130 may use this sharing as a key marketing feature of the service, as groups of users 110 can create and share their own channels.

Notably, neither of the types of synchronization may be guaranteed by default, according to certain embodiments. The atoms that are stored for any single channel in a subscriber's user dictionary 424 may depend on the relative value of those atoms when compared with atoms for all other channels (e.g., as described above). For example, the user preference filters 432 for two different users 110 subscribing to the same channel may result in different decisions about which items are added and when they are removed. Further, the playback of content may not normally be fixed, but may depend on when the subscriber wishes to play the channel. For example, each subscriber may choose to view the channel at different times.

In some embodiments, synchronization of channel content is facilitated by treating the shared channel differently from a non-shared channel. At least two factors may be involved. First, as discussed above, subscribers may typically determine variable amounts of storage capacity (e.g., bins) for storing channel content. In certain embodiments, bin sizes for shared content are forced to a fixed size. The fixed size may be determined by default, by the user 110 or users 110 that established the shared channel, by the broadcaster 130, etc. For example, in some embodiments, the space for a non-shared channel's atoms may be reduced if another channel has higher value content, and channels may be allocated extra space when atoms are incorporated into multiple channels. A shared channel may be required to make decisions on the assumption that it has a fixed space available to it.

A second factor may be that the evaluation of atoms added to the shared channel may be made on the basis of their value only to the shared channel. For example, as described above, an atom might not be valued high enough for the target channel to be added to user dictionary 424 for a particular user 110, but its value to another channel may cause it to be added. For a non-shared channel, this atom may then be included in the target channel. In certain embodiments, for a shared channel, the atom cannot be visible to the target channel unless it is sufficiently valuable in isolation of its value to other channels. Isolating these two factors may allow the same valuation decisions to be made by different subscribers, even when their respective user preference filters 432 express different user preferences.

It will be appreciated that external synchronization may be needed between members of a synchronized group to reduce or eliminate different storing decisions as a result of different dictionary histories, viewing histories, and user interactions, etc. (e.g., as shown in the method 700 of FIG. 7). In some embodiments, peer-to-peer techniques are used to synchronize user dictionaries 424. In other embodiments, broadcasters 130 provide mediation services.

Figure 10:
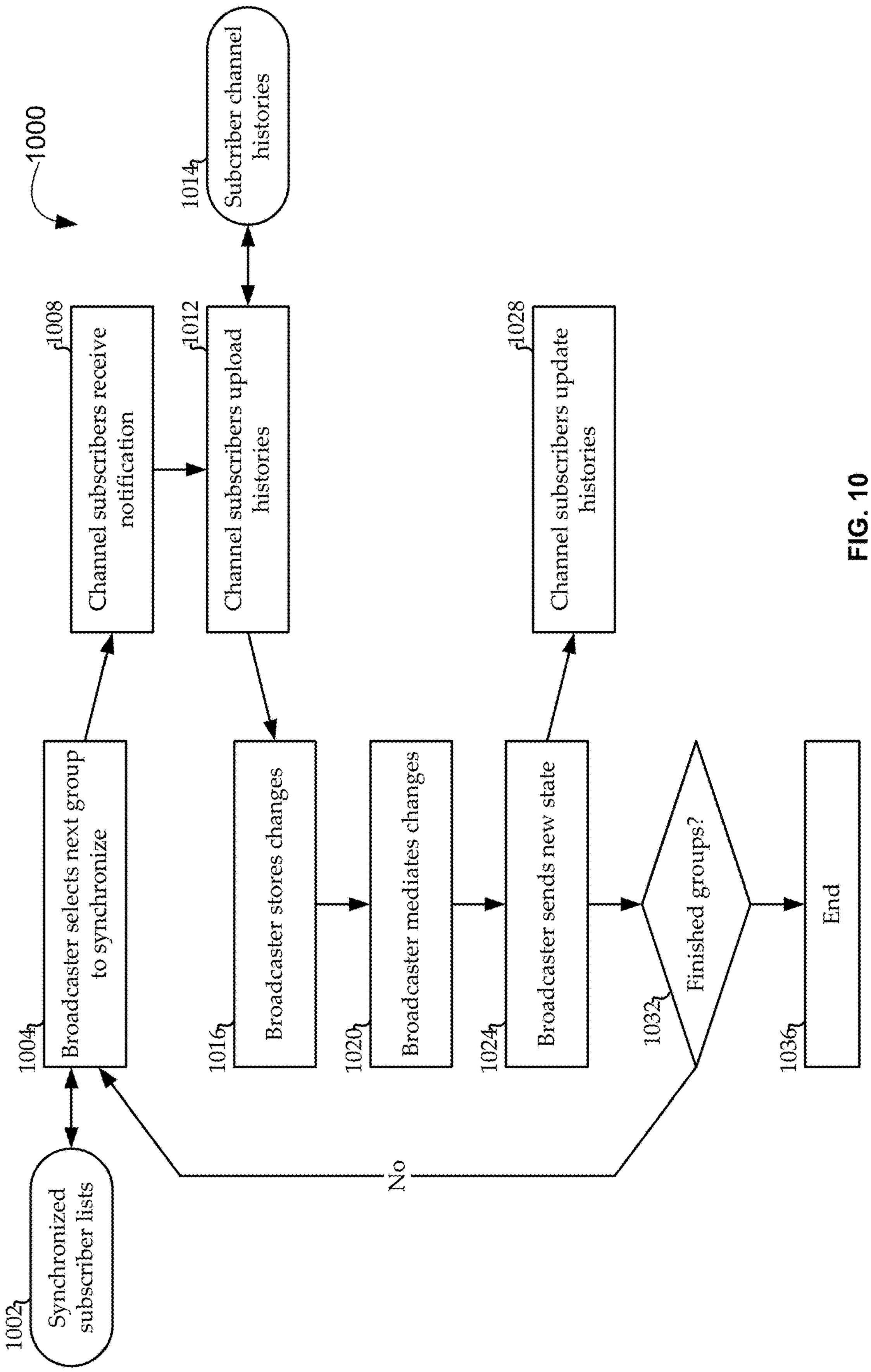
FIG. 10 shows a flow diagram of a method for a mediation service for channel content synchronization, according to various embodiments.

FIG. 10 shows a flow diagram of a method 1000 for a mediation service for channel content synchronization, according to various embodiments. According to embodiments of the method 1000, user 110 groups desiring synchronization register with the broadcaster 130 or another entity performing the mediation. The registration may occur substantially as a result of subscribing to a shared channel, as a result of subscribing to the mediation service, or in any other useful way at any other useful time. Registered subscribers may be part of a subscriber list 1002.

Embodiments of the method 1000 begin at block 1004 when the broadcaster selects a next group from the subscriber list 1002 to synchronize. The synchronization may be performed periodically (e.g., on a daily basis), on-demand, variably (e.g., depending on detecting fresh content), etc. The synchronization timing may be different and/or adjustable for different shared channels. As part of selecting the next group to synchronize at block 1004, the mediation entity (e.g., the broadcaster 130) may broadcast a notification message to all members of the group. For example, the notification message may be communicated over the network 240 as a special stream for receipt by all user terminals 420 (e.g., or all user terminals 420 on a particular carrier, when all the subscribers for synchronization are determined to be on one carrier).

At block 1008, the subscribers receive the notification. In response to receiving the notification, the subscribers may collect data 1014 relevant to the channel that needs to be synchronized in order to synchronize their respective user dictionaries 424 (e.g., to create the same evaluation determinations according to methods described above). For example, the data 1014 may include cache history, viewing history, interaction requests, etc. At block 1012, the data 1014 is uploaded to the mediation entity.

At block 1016, the mediation entity may receive and store the uploaded data 1014 from each subscriber. In some embodiments, the subscriber list 1002 is maintained in long-term storage, while the uploaded data 1014 (e.g., the cache and viewing histories) is maintained in short-term storage. For example, the uploaded data 1014 may only be used for performing the current iteration of the method 1000.

Embodiments of the method 1000 continue at block 1020 by mediating changes according to the uploaded data 1014. In one embodiment, the mediation entity may arbitrate between the different subscribers to establish a common framework that will be used to control storage of the channel data. For example, if all subscribers have seen a particular television program, the atom may be marked as low value for all the subscribers in the group, so that the user dictionary 424 capacity for the channel can be used for fresh content. If no subscribers have yet watched it, the program may be maintained in the user dictionary 424 and may be considered still valuable (e.g., subject to an age calculation). If some subscribers have watched and others have not, arbitration may be needed so that all user dictionaries 424 (e.g., or their respective user preference filters 432, dictionary managers 428, etc.) make the same determinations of atom value.

In some embodiments, the mediation at block 1020 is specified in the channel parameters to allow individual groups to set their own mediation procedures. In one embodiment, an item is considered as being "watched" by the group when more than twenty-percent of the members have viewed it. In another embodiment, user interactions, such as adjusting the value of atoms, may be mediated on a fifty-percent basis, so that decisions are accepted only when more than half the subscriber's in the group have preferences that agree. Notably, the dictionary history for a channel should be the same for all subscribers to the channel, but a viewer who joined the group at a different time or was offline during a transfer may need to be updated as part of the mediation in block 1020.

At block 1024, the mediation entity may send the result of the mediation in block 1020 to the subscribers. For example, the broadcasters 130 may send the mediation results via the broadcast link to the subscribers. At block 1028, the subscribers may update their channel histories according to the mediation results, thereby facilitating synchronization of that subscriber group with respect to that channel.

At block 1032, a determination is made as to whether more groups need synchronization. If more groups need synchronization, the method 1000 may return to block 1004 and continue to synchronize other groups from the subscriber list 1002. If no more groups need synchronization, the method 1000 may end at block 1036.

It will be appreciated that a mediated approach, as illustrated in FIG. 10, may provide an optimized user experience, as it may adjust decisions based on actual content viewing by the subscribers. In an alternate embodiment, channel content is synchronized by using channel parameters to specify rules (e.g., predefined, arbitrary, etc.) for longevity of channel content in subscribers' user dictionaries 424. For example, a television program may be considered stale after one week. This alternate approach may reduce or eliminate mediation or synchronization, and may be simpler to implement in some cases. However, the alternate approach may be less responsive to subscriber preferences and actual consumption of the channel content.

In another alternate approach, as discussed above, channel content synchronization is handled via peer-to-peer communication. In certain embodiments, certain blocks may be performed in the same way, though data collection may be different. For example, peer-to-peer techniques may be used to communicate changes, content, histories, etc., while the mediation in block 1020 may be substantially the same as described above. If the peer-to-peer communication is consuming bandwidth on the broadcast link, it may be a less efficient way to utilize this bandwidth. However, the peer-to-peer alternative may offload processing requirements from the mediation entity (e.g., the broadcaster 130) and may support more interaction between peers to mediate issues.

As discussed above, it may additionally or alternatively be desirable to synchronize channel playback. For example, substantially concurrent viewing may facilitate certain social networking features. Playback synchronization may involve allowing a group of subscribers to have the same atoms played back in the same sequence at substantially the same time. This may allow a group of viewers at different locations to concurrently view the same content, similar to the way broadcasting worked in a traditional broadcast paradigm. This playback synchronization may facilitate social interaction via chat, voice, or other means that interacts with a common entertainment stream. Synchronization may also be useful for other business, consumer, and educational purposes.

In some embodiments, playback synchronization is implemented as part of a peer-to-peer application that interconnects group members. The peer-to-peer application may facilitate the synchronized playback and may further support one or more other applications for providing a broad range of interaction functionality. For example, a group can be watching a sequence of viral video clips together at different locations, and one member posts a message saying they should take a popcorn break. If a consensus is reached, the playback is paused and later restored for all members simultaneously.

The above description is intended to provide various embodiments of the invention, but does not represent an exhaustive list of all embodiments. For example, those of skill in the art will appreciate that various modifications are available within the scope of the invention. Further, while the disclosure includes various sections and headings, the sections and headings are not intended to limit the scope of any embodiment of the invention. Rather, disclosure presented under one heading may inform disclosure presented under a different heading. For example, descriptions of embodiments of method steps for handling overlapping content requests may be used to inform embodiments of methods for handling anticipatory requests.

Specific details are given in the above description to provide a thorough understanding of the embodiments. However, it is understood that the embodiments may be practiced without these specific details. For example, well-known processes, algorithms, structures, and techniques may be shown without unnecessary detail in order to avoid obscuring the embodiments. Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field-programmable gate arrays (FPGAs), soft core processors, hard core processors, controllers, micro-controllers, microprocessors, other electronic units designed to perform the functions described above, and/or a combination thereof. Software can be used instead of or in addition to hardware to perform the techniques, blocks, steps and means.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. Similarly, terms like "cache" are intended to broadly include any type of storage, including temporary or persistent storage, queues (e.g., FIFO, LIFO, etc.), buffers (e.g., circular, etc.), etc. The term "machine-readable medium" includes, but is not limited to portable or fixed storage devices, optical storage devices, wireless channels, and/or various other storage mediums capable of storing that contain or carry instruction(s) and/or data.

Further, certain portions of embodiments (e.g., method steps) are described as being implemented "as a function of" other portions of embodiments. This and similar phraseologies, as used herein, intend broadly to include any technique for determining one element partially or completely according to another element. For example, a method may include generating a fingerprint from a first request and generating a determination "as a function of" the fingerprint. In various embodiments, the determination may be made in any way, so long as the outcome of the determination generation step is at least partially dependent on the outcome of the fingerprint generation step.

While the principles of the disclosure have been described above in connection with specific apparatuses and methods, it is to be clearly understood that this description is made only by way of example and not as limitation on the scope of the disclosure.

What is claimed is:

1. A method for a communications system having a communications path comprising a forward link to a client side of the communications system, comprising:

receiving, at a broadcaster, a user request for content from a user system of the communication system, the user request having been re-routed to the broadcaster in response to a request for the content sent to a content provider over a private internet protocol (IP) connection between the user and the content provider, wherein the request for the content is originally routed from the user system to the content provider over the private IP connection;

obtaining the content at the broadcaster; and communicating the content from the broadcaster to the user system using the forward link of the communications system between the broadcaster and the user system.

2. The method of claim 1, wherein the user request is a selection from a list of content available for download that is provided to the user system via the private IP connection in response to a search query from the user system over the private IP connection.

3. The method of claim 1, wherein the obtaining the content at the broadcaster comprises accessing a co-located content server at the broadcaster.

4. The method of claim 1, wherein the obtaining the content at the broadcaster comprises receiving the content from the content provider over a network connection between the broadcaster and the content provider.

5. The method of claim 1, wherein the broadcaster comprises a server system comprising components for server-side communications.

6. The method of claim 1, wherein the user request is intercepted prior to being re-routed to the broadcaster.

7. The method of claim 6, wherein the user request is intercepted by a client optimizer at the user system.

8. The method of claim 6, wherein the user request is intercepted by a server optimizer of a server system on a server-side of the communications system.

9. The method of claim 1, wherein the communications system comprises a satellite communication system.

10. The method of claim 9, wherein the broadcaster comprises a server system located in a gateway of the satellite communication system.

11. The method of claim 9, wherein at least the forward link of the communications system is provided via a satellite of the satellite communication system.

12. The method of claim 11, wherein the forward link of the communications system comprises a carrier of the satellite.

13. The method of claim 12, wherein the carrier comprises a spot beam of the satellite.

14. The method of claim 11, wherein the forward link of the communications system comprises a modcode point of the satellite.

15. The method of claim 14, wherein the modcode point is selected so that at least a threshold number of user systems reliably receive the content.

16. The method of claim 1, wherein the forward link comprises a shared forward link in operative communication with a plurality of user systems on the client side of the communications system.

17. The method of claim 16, wherein the plurality of user systems comprise at least one user grouping comprising user systems according to user preferences of the user systems.

18. The method of claim 16, wherein the content is multicast to the plurality of user systems on the client side of the communications system, and wherein at least one of the plurality of user systems is a non-requesting user system that determines to store the content based on past user behavior of the non-requesting user system.

19. The method of claim 18, wherein the non-requesting user system determines whether to store the content in a non-requesting user dictionary at least in part based on one or more preferences of the non-requesting user system.

20. The method of claim 16, further comprising:

determining whether to multicast the content over the shared forward link to at least one non-requesting user system in addition to the user system.

21. The method of claim 20, wherein the determining whether to multicast the content comprises determining whether to add the content to a channel of the shared forward link.

22. The method of claim 21, wherein the determining whether to add the content to the channel of the shared forward link is at least in part based on a value of the content with respect to the channel.

23. The method of claim 22, wherein the value of the content with respect to the channel is at least in part based on content stored in one or more user dictionaries of one or more corresponding user systems on the client side of the communications system.

24. The method of claim 23, wherein the value of the content with respect to the channel is at least in part based on opportunity costs relating to content already in the one or more user dictionaries of the one or more corresponding user systems on the client side of the communications system.

25. The method of claim 24, wherein the opportunity cost is at least in part based on a viewing history for the one or more corresponding user systems on the client side of the communications system.

26. The method of claim 22, wherein the value of the content with respect to the channel is at least in part based on how the content affects an overall level of satisfaction of preferences of a plurality of user systems at the client side of the communications system.

27. The method of claim 22, wherein the value of the content with respect to the channel is at least in part based on channel management preferences of the channel.

28. A communications system for providing content via a communications path comprising a forward link to a client side of the communication system, comprising:

a server system;

a gateway; and a broadcaster operative to receive a user request for the content from a user system of the client side of the communication system as a re-routed request from a private internet protocol (IP) connection between the user system and a content source, wherein the request for the content is originally routed from the user system to the content source over the private IP connection, wherein the server system is operative to obtain the content at the broadcaster, and wherein the gateway is operative to communicate the content from the broadcaster to the user system using the forward link of the communications system between the broadcaster and the user system.

29. The system of claim 28, wherein the user request is a selection from a list of content available for download that is provided to the user system by the content source via the private IP connection in response to a search query from the user system over the private IP connection.

30. The system of claim 28, further comprising:

a content server co-located at the server system, wherein the content is obtained by accessing the content server.

31. The system of claim 28, wherein the server system comprises a network connection with the content provider, wherein the content is obtained by receiving the content from the content provider over the network connection.

32. The system of claim 28, wherein the broadcaster comprises the server system and the gateway.

33. The system of claim 28, wherein the user request is intercepted prior to being re-routed to the broadcaster.

34. The system of claim 33, further comprising:

a client optimizer at the user system, wherein the user request is intercepted by the client optimizer.

35. The system of claim 33, further comprising:

a server optimizer executed by the server system, wherein the user request is intercepted by the server optimizer.

36. The system of claim 28, wherein the communications system comprises a satellite communication system.

37. The system of claim 36, wherein at least the forward link of the communications system is provided via a satellite of the satellite communication system.

38. The system of claim 37, wherein the forward link of the communications system comprises a carrier of the satellite.

39. The system of claim 38, wherein the carrier comprises a spot beam of the satellite.

40. The system of claim 37, wherein the forward link of the communications system comprises a modcode point of the satellite.

41. The system of claim 40, wherein the modcode point is selected so that at least a threshold number of user systems reliably receive the content.

42. The system of claim 28, wherein the forward link comprises a shared forward link in operative communication with a plurality of user systems on the client side of the communications system.

43. The system of claim 42, wherein the plurality of user systems comprise at least one user grouping comprising user systems according to user preferences of the user systems.

44. The system of claim 42, wherein the content is multicast to the plurality of user systems on the client side of the communications system, and wherein at least one of the plurality of user systems is a non-requesting user system that determines to store the content based on past user behavior of the non-requesting user system.

45. The system of claim 44, wherein the non-requesting user system determines whether to store the content in a non-requesting user dictionary at least in part based on one or more preferences of the non-requesting user system.

46. The system of claim 42, wherein the server system determines whether to multicast the content over the shared forward link to at least one non-requesting user system in addition to the user system.

47. The system of claim 46, wherein the determining whether to multicast the content comprises determining whether to add the content to a channel of the shared forward link.

48. The system of claim 47, wherein the determining whether to add the content to the channel of the shared forward link is at least in part based on a value of the content with respect to the channel.

49. The system of claim 48, wherein the value of the content with respect to the channel is at least in part based on content stored in one or more user dictionaries of one or more corresponding user systems on the client side of the communications system.

50. The system of claim 49, wherein the value of the content with respect to the channel is at least in part based on opportunity costs relating to content already in the one or more user dictionaries of the one or more corresponding user systems on the client side of the communications system.

51. The system of claim 50, wherein the opportunity cost is at least in part based on a viewing history for the one or more corresponding user systems on the client side of the communications system.

52. The system of claim 48, wherein the value of the content with respect to the channel is at least in part based on how the content affects an overall level of satisfaction of preferences of a plurality of user systems at the client side of the communications system.

53. The system of claim 48, wherein the value of the content with respect to the channel is at least in part based on channel management preferences of the channel.

* * * * *